United States Patent [19]

Nagashima

[11] Patent Number: 5,774,760
[45] Date of Patent: Jun. 30, 1998

[54] METHOD OF CONTROLLING COLOR CORRECTION AND APPARATUS FOR IMAGEWISE EXPOSURE USING SAID METHOD

[75] Inventor: Kanji Nagashima, Kanagawa, Japan

[73] Assignee: Fuji Photo Film Co., Ltd., Kanagawa, Japan

[21] Appl. No.: 572,175

[22] Filed: Dec. 13, 1995

[30] Foreign Application Priority Data

Dec. 14, 1994 [JP] Japan ................................ 6-310888

[51] Int. Cl.$^6$ ............................................. G03G 15/01
[52] U.S. Cl. .......................... 399/39; 399/178; 358/518
[58] Field of Search .................... 399/39, 178; 355/71; 347/134–136; 358/518–521, 523

[56] References Cited

U.S. PATENT DOCUMENTS

| | | | |
|---|---|---|---|
| 5,019,873 | 5/1991 | Imaeda | 399/138 |
| 5,053,808 | 10/1991 | Takagi | 355/38 |
| 5,262,832 | 11/1993 | Takeda | 399/178 |
| 5,321,487 | 6/1994 | Shiba et al. | 399/178 |
| 5,495,348 | 2/1996 | Sakai et al. | 358/501 |

*Primary Examiner*—Robert Beatty
*Attorney, Agent, or Firm*—Sughrue, Mion, Zinn, Macpeak & Seas

[57] ABSTRACT

The improved method of color correction control is capable of assuring the desired amounts of color correction at all times, thereby reproducing a high-quality image of good color balance even from an original image that is so much upset in color balance as to require that color filters for three primary colors be inserted into the optical path in greatly varying amounts. Seven tables are preliminarily constructed for each of the three primary colors that represent the relationships between the amounts of insertion of color filter into the optical path and the amounts of resulting color correction, three tables for the insertion of three single color filters, three for the insertion of any two filters and one for the insertion of the three filters in combination. After the desired amounts of color correction are determined for the light carrying an original image, the initial values for the positions of the insertion of the three color filters are set and the amounts of filter insertion are divided into three cases, one being the amount of insertion of the three filters in combination, the second being the amount of insertion of any two filters and the third being the amount of insertion of a single filter. Using the associated seven tables, the amounts of color correction are determined for the respective cases and subjected to either an arithmetic addition or subtraction to provide a calculated amount of correction of each color. The amounts of filter insertion are changed until the differences from the respective desired amounts of color correction are converted to values less than a specified threshold.

8 Claims, 9 Drawing Sheets

C Table from C filter

M Table from M filter

Y Table from Y filter

M Table from C, M and Y filters

M Table from C and M filters

M Table from C filter

FIG. 10
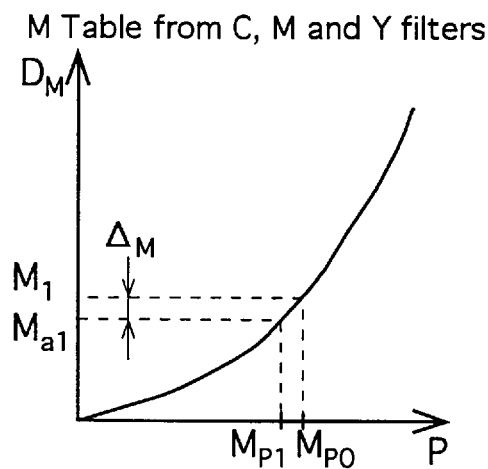
M Table from C, M and Y filters
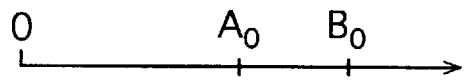
FIG. 11a
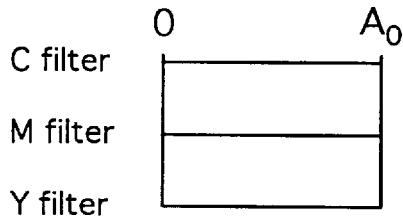 + 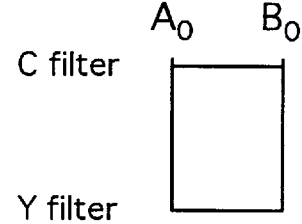
FIG. 11b
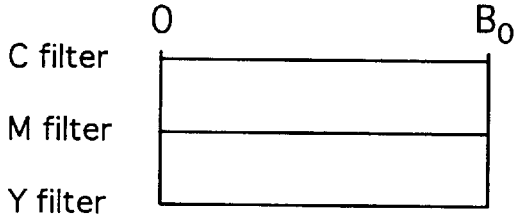 − 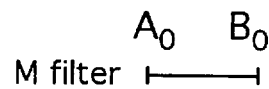
FIG. 11c C Table from C, M and Y filters M Table from C, M and Y filters Y Table from C, M and Y filters

METHOD OF CONTROLLING COLOR CORRECTION AND APPARATUS FOR IMAGEWISE EXPOSURE USING SAID METHOD

BACKGROUND OF THE INVENTION

This invention relates to a color correction control method applicable to image recording apparatus such as color printers and color copiers, as well as image reading apparatus. The invention also relates to an apparatus for imagewise exposure that uses the method. More specifically, the invention relates to a color correction control method that is applicable to the reproduction or reading of image not only from reflection-type originals such as prints and photographs but also from transmission-type positive originals such as lantern slides (reversal films) and proofs, as well as from transmission-type negative originals such as negative films and which is capable of achieving proper color correction by controlling the amounts in which color filters are inserted into the optical path of the light carrying the image of an original of interest. The invention also relates to an apparatus for imagewise exposure that performs said color correction control method.

Most of the conventional image forming apparatuses such as color copiers and various types of color printers have been adapted for reproducing image from reflection-type originals such as printed matter. However, the technology of recording image information has recently become so versatile that image forming apparatuses have been commercialized that are capable of image recording on light-sensitive materials by reading image not only from reflection-type originals such as printed matter and photographs but also from transmission-type positive originals such as lantern slides, proofs and microfilms.

Image forming apparatus that is adapted for the use of both a reflection-type original and a transmission-type positive original is equipped with a light source unit or a film scanning unit that compose the exposure optics for image formation from the transmission-type positive original, and the user performs imagewise exposure on the light-sensitive material by means of the appropriate exposure optics as selected in accordance with the kind of document to be duplicated and the size of the transmission-type positive original of interest.

Speaking of transmission-type negative originals such as negative films and negatives for printing, they have been shot by many and unspecified users and, hence, are characterized by varying shooting conditions. To cope with this situation, transmission-type negative originals are conventionally printed with dedicated photograph printers. An attempt, however, is being made to record the images of transmission-type negative originals on light-sensitive materials using the exposure optics for transmission-type positive originals in image forming apparatus of the type described in the preceding paragraph which is compatible with both reflection-type originals and transmission-type positive originals. Along with this attempt, development efforts are being made to provide suitable light-sensitive materials and exposure optics.

With conventional exposure optics, or apparatus for imagewise exposure, particularly for exposing transmission-type positive originals such as lantern slides, color correction for producing images of good color balance on light-sensitive materials at all times is effected by inserting filters of three primary colors C, M and Y into the optical path of exposing light. To insure the intended color correction, each unit of the apparatus for imagewise exposure is subjected to photometry by means of an optical sensor with the three color filters C, M and Y being inserted simultaneously into the optical path of exposing light by equal amounts and color correction tables that are prepared by actual multi-point measurements of the relationship between the amount of filter insertion and the amount of color correction for C, M and Y are stored in a memory such as ROM.

In an actual exposing operation, the stored color correction tables are used to determine the amounts of insertion of the three color filters C, M and Y that are necessary to achieve the correction of a specific color. If the relative positions of the three color filters differ from the preset values, the differences from the color correction table are represented by a single matrix and 3×3 matrix interpolation (see below) is performed to correct the specific position (amount) of insertion:

$$\begin{pmatrix} C_p \\ M_p \\ Y_p \end{pmatrix} = \begin{pmatrix} \alpha_{CC} & \alpha_{MC} & \alpha_{YC} \\ \alpha_{CM} & \alpha_{MM} & \alpha_{YM} \\ \alpha_{CY} & \alpha_{MY} & \alpha_{YY} \end{pmatrix} \begin{pmatrix} C_1 \\ M_1 \\ Y_1 \end{pmatrix}$$

where Cp, Mp and Yp represent the amounts of insertion of the respective color filters C, M and Y (i.e., concentrations by which the filters are actually moved); $C_1$, $M_1$ and $Y_1$ represent the amounts of color correction for C, M and Y (i.e., the desired concentrations); and $\alpha_{ij}$ (i, j=C, M, Y) represents the coefficient of the effect a filter i has on a concentration j.

The prior art method of determining the amounts of insertion of color filters will now be described by reference to FIGS. 12a–12c which illustrate typical changes in the quantities of R, G and B light components as measured after the three color filters C, M and Y were moved simultaneously (the changes correspond to those in the densities of C, M and Y, or the respective amounts of the necessary color correction). Given densities $C_1$, $M_1$ and $Y_1$ that are required by an original image of interest, the graphs in FIGS. 12a–12c enable one to determine Cpo, Mpo and Ypo which represent the approximate positions of the three color filters C, M and Y for the required densities. However, if the densities ($C_1$, $M_1$, $Y_1$) and the amounts of filter insertion (Cpo, Mpo, Ypo) differ from the measured values, the latter cannot be determined in the correct one-to-one correspondence to the former and the certain deviations involved are corrected by the 3×3 matrix just mentioned above.

This prior art method for controlling the amounts of color correction assures satisfactory levels of correctness if the three color filters C, M and Y are moved simultaneously or if the deviations in their movements are small between any two color filters. Therefore, if the original to be duplicated is of a reflection-type or a transmission positive type which are inherently limited in deviations from color balance, the prior art method of color correction control is capable of efficient color correction to provide a reproduced image of good color balance.

On the other hand, if the original to be duplicated is greatly upset in color balance as is often the case of transmission-type negative originals such as negative films, the three color filters C, M and Y are occasionally moved in substantially different ways, making it difficult to achieve the desired color correction with the color filters inserted in the amounts determined by the above-described prior art method of color correction. Stated more specifically, in the conventional method of correcting the deviations between color filters by 3×3 matrix interpolation, the correction formula is linear and prone to cause great errors when substantial correction has to be effected by moving the respective color filters in greatly different amounts.

This problem might be solved by using a higher-order correction formula; in fact, however, a formula for a three-dimensional space in which the three color filters C, M and Y affect one another is difficult to approximate in a proper way, so it is difficult to provide an approximation that causes only small errors over a broad range of correction.

SUMMARY OF THE INVENTION

The present invention has been accomplished under these circumstances and has as an object providing a method of color correction control that is capable of assuring at all times the desired amounts of color correction and reproducing a high-quality image of good color balance even from an original image that is so much upset in color balance as to require that the color filters of three primary colors such as C, M and Y or R, G and B be inserted into the optical path in greatly different amounts.

Another object of the invention is to provide an apparatus for imagewise exposure that employs said method of color correction control to record a high-quality image of good color balance or to read the image of an original as one of good color balance.

The first object of the present invention can be attained by its first aspect, which provides a method of controlling color correction, in which three color filters of three primary colors to be inserted into a optical path of light that is issued from a source to be either reflected by a reflection-type original or transmitted through a transmission-type original and which thereafter passes through an imaging lens to reach a light-sensitive recording medium or an imaging device, are controlled in the respective amounts of insertion of said filters such as to correct the color densities of the original image which is carried by the light to be focused on said a light-sensitive recording medium or said imaging device, said method comprising the steps of:

preliminarily constructing seven tables for each of said three primary colors that represent the relationships between the amounts of insertion of the filters and the amounts of correction of one of said three primary colors, three of said tables being for the insertion of said three color filters individually into said optical path, three for the insertion of any two filters in combination, and one for the simultaneous insertion of all three filters in combination;

calculating from at least one table for each color the initial values for the amounts of insertion of the three color filters in connection with the required amounts of correction of said three primary colors that is to be effected on the light carrying the original image;

dividing the calculated amounts of insertion of the three filters into three cases for the amount of color correction, one referring to the amount of correction of each color by inserting the combination of the three color filters and which is based on the table for said combination, the second referring to the amount of correction of each color by inserting a combination of said any two color filters and which is based on the table for said combination and the third referring to the amount of correction of each color by inserting a single color filter and which is based on the table for that single color, and performing an arithmetic addition or subtraction on said amounts of color correction to provide a calculated amount of correction of each color;

determining for each color the difference between the thus provided calculated amount of color correction and said required amount of color correction; and using said difference for each color to change the calculated amounts of insertion of said three color filters, repeating the procedures of providing said calculated amount of correction of each color using the calculated amounts of insertion of said three color filters and determining for each color the difference between said calculated amount of color correction and said required amount of color correction, and determining the amounts of insertion of said three color filters at which said difference is less than a specified threshold.

In one embodiment, the method additionally uses light control means in said optical path for adjusting the quantity of light and further includes the steps of:

providing said seven tables for each of said primary three colors in association with more than one quantity of light as adjusted by said light control means; and determining the amounts of insertion of said three color filters necessary to provide the required amount of color correction at a required quantity of light either using as such a group of tables associated with one quantity of light adjustment selected from among the tables associated with said more than one quantity of light adjustment or using an interpolation method as applied to two groups of tables associated with two quantities of light adjustment.

In a preferred embodiment, said change in the calculated insertion of amounts of said three color filters using said difference for each color is effected by calculating the amounts of insertion of said three color filters on the basis of said difference for each color using the three tables that have been used to provide said calculated amount of color correction.

In another preferred embodiment, said change in the calculated amounts of insertion of said three color filters using said difference for each color is effected by performing an arithmetic addition or subtraction on preset amounts of change in the amounts of insertion of the color filters for each color on the basis of said difference for each color.

The second object of the present invention can be attained by its second aspect, which provides an apparatus for imagewise exposure comprising a light source for illuminating a reflection- or transmission-type original, an imaging lens to focus the image of said original, a light-sensitive recording medium for recording the focused original image or an imaging device for reading said original image, three filters of three primary colors to be inserted in the optical path from said light source to said light-sensitive recording medium or said imaging device, and color correction control means which controls the respective amounts of insertion of said three color filters such as to correct the color densities of the original image which is carried by the light to be focused on said a light-sensitive recording medium or said imaging device, said color correction control means having seven tables that have been constructed preliminarily for each of said three primary colors and which represent the relationships between the amounts of insertion of the filters and the amounts of correction of one of said three primary colors, three of said tables being for the insertion of said three color filters individually into said optical path, three for the insertion of any two filters in combination, and one for the simultaneous insertion of all three filters in combination, said color correction control means also having computing means which:

calculates from at least one table for each color the initial values for the amounts of insertion of the three color filters in connection with the required amounts of correction of said three primary colors that is to be effected on the light carrying the original image;

divides the calculated amounts of insertion of the three filters into three cases for the amount of color correction, one referring to the amount of correction of each color by inserting the combination of the three color filters and which is based on the table for said combination, the second referring to the amount of correction of each color by inserting a combination of said any two color filters and which is based on the table for said combination and the third referring to the amount of correction of each color by inserting a single color filter and which is based on the table for that single color, and performs an arithmetic addition or subtraction on said amounts of color correction to provide a calculated amount of correction of each color;

determines for each color the difference between the thus provided calculated amount of color correction and said required amount of color correction; and uses said difference for each color to change the calculated amounts of insertion of said three color filters, repeats the procedures of providing said calculated amount of correction of each color using the calculated amounts of insertion of said three color filters and determining for each color the difference between said calculated amount of color correction and sa id required amount of color correction, and determines the amounts of insertion of said three color filters at which said difference is less than a specified threshold.

In one embodiment, the apparatus further includes light control means for adjusting the quantity of light, said color correction control means further having a group of said seven tables for each of said three primary colors in association with more than one quantity of light as adjusted by said light control means, and said computing means determining the amounts of insertion of said three color filters necessary to provide the required amount of color correction at a required quantity of light either using as such a group of tables associated with one quantity of light adjustment selected from among the tables associated with said more than one quantity of light adjustment or using an interpolation method as applied to two groups of tables associated with two quantities of light adjustment.

In a preferred embodiment, said computing means, when changing the calculated amounts of insertion of said three color filters using said difference for each color, calculates the amounts of insertion of said three color filters on the basis of said difference for each color using the three tables that have been used to provide said calculated amount of color correction.

In another preferred embodiment, said computing means changes the calculated amounts of insertion of said three color filters using said difference for each color by performing an arithmetic addition or subtraction on preset amounts of change in the amounts of insertion of the color filters for each color on the basis of said difference for each color.

The method of color correction control according to the first aspect of the invention is such that before the light carrying the image of a reflection- or transmission-type original is focused for recording on a light-sensitive recording medium such as a light-sensitive material or for reading with an imaging device such as imaging sensor, the amount of color correction with three primary color filters is measured for each of the three primary colors at a number of positions of filter insertion as the filters are inserted in seven different ways, three for their independent use, three for the combination of any two filters, and one for the combination of three filters, whereby seven color correction tables each representing the relationship between the amount of color correction and the amount of insertion of a specific color filter are constructed for each of the three primary colors.

When recording or reading the actual original image, one or more of the color correction tables are used to determine the initial values for the amounts of insertion of the three color filters in association with the amount of correction of each color that is required by a specific original. Then, on the basis of the initialized amounts of filter insertion, the amount of color correction is determined for the combination of three color filters, the combination of any two filters and for single filters and the thus determined amounts of color correction are subjected to an arithmetic addition or subtraction for each color to provide the calculated amount of correction of each color. Subsequently, the calculated amount of color correction is compared with the corresponding required amount of color correction and until the difference decreases and converges to a value less than a specified threshold, the amounts of insertion of the three color filters are varied using said difference or those amounts of insertion are varied in minimum controllable units, followed by repeating the same procedures of calculating the amount of color correction and its difference from the required amount of color correction, thereby computing the correct amount in which each of the color filters should be inserted into the optical path.

If, in addition to color correction with color filters, the amount of exposing light is to be adjusted by light control means, the already-described group of color correction tables are provided for more than one quantity of the exposing light such that an unspecified quantity of the exposing light is determined by interpolation from said groups of color correction tables and on the basis of the thus determined value, the above-described method of color correction control is applied to determine the amounts (positions) in which the respective color filters should be inserted into the optical path of the exposing light.

Thus, according to the invention, the amounts (positions) of insertion of the three color filters can be correctly set to assure the desired color correction even if substantial correction has to be effected by moving the respective color filters in greatly different amounts.

Hence, the apparatus according to the second aspect of the invention which performs imagewise exposure using the above-described method of color correction control is capable of recording, reproducing or reading a high-quality image of good color balance even if the original to be duplicated has an image greatly upset in color balance.

BRIEF DESCRIPTION OF THE DRAWINGS

FIG. 10 is a graph showing an example of the method of determining a changed position of M filter from the difference (A) between the required amount of M correction at a given density and the calculated value;

FIG. 11a is a diagram showing an example of the amounts of insertion of C, M and Y filters;

FIG. 11b is a diagram showing an example of the method of controlling color correction by addition according to the invention;

FIG. 11c is a diagram showing an example of the method of controlling color correction by subtraction according to the invention;

DETAILED DESCRIPTION OF THE INVENTION

The color correction control method of the present invention and the apparatus for imagewise exposure using said method will now be described in detail with reference to the preferred embodiment shown in the accompanying drawings.

Figure 1:
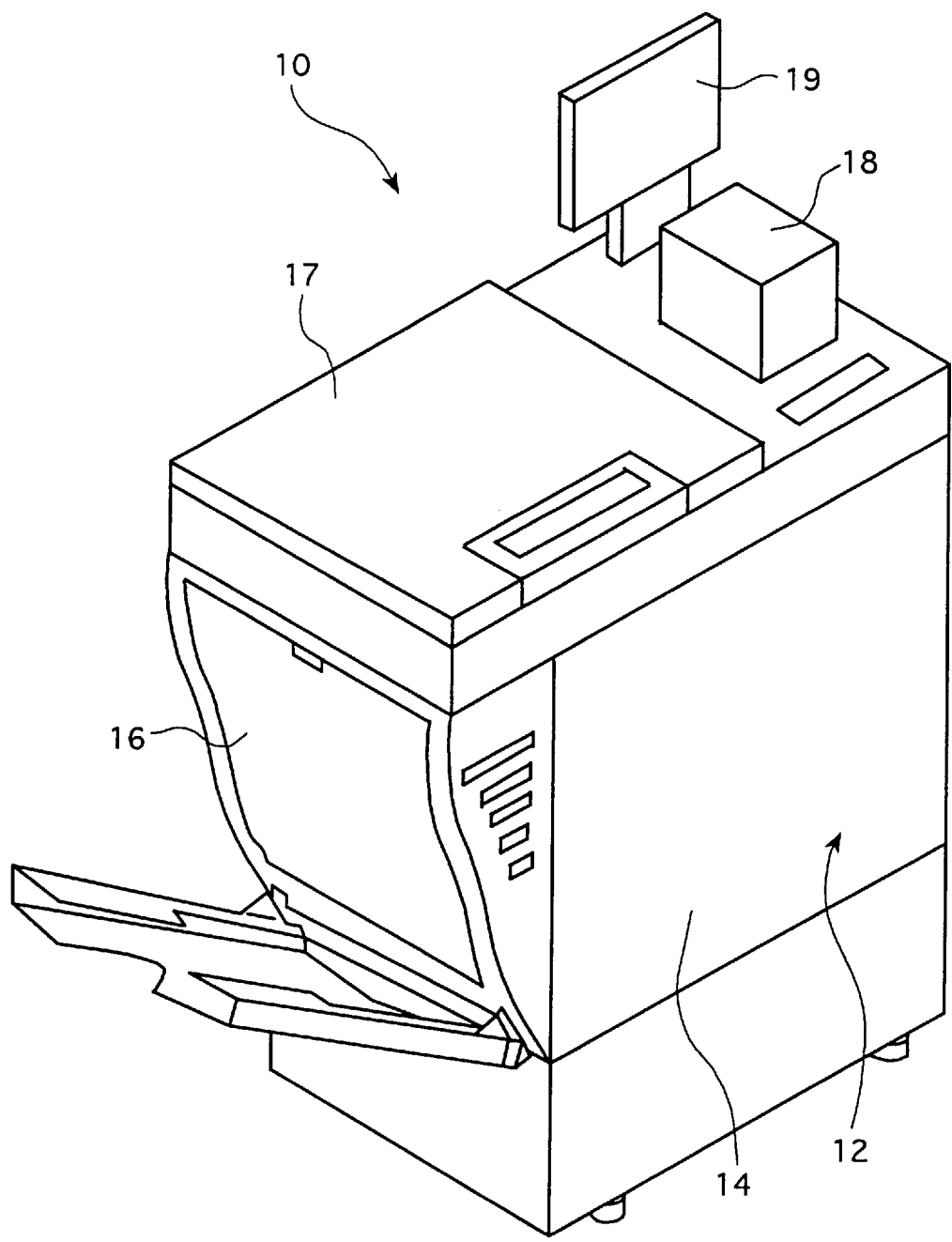
FIG. 1 is a simplified perspective view of an embodiment of the image recording apparatus that uses an apparatus for imagewise exposure implementing the color correction control method of the invention.
Figure 2:
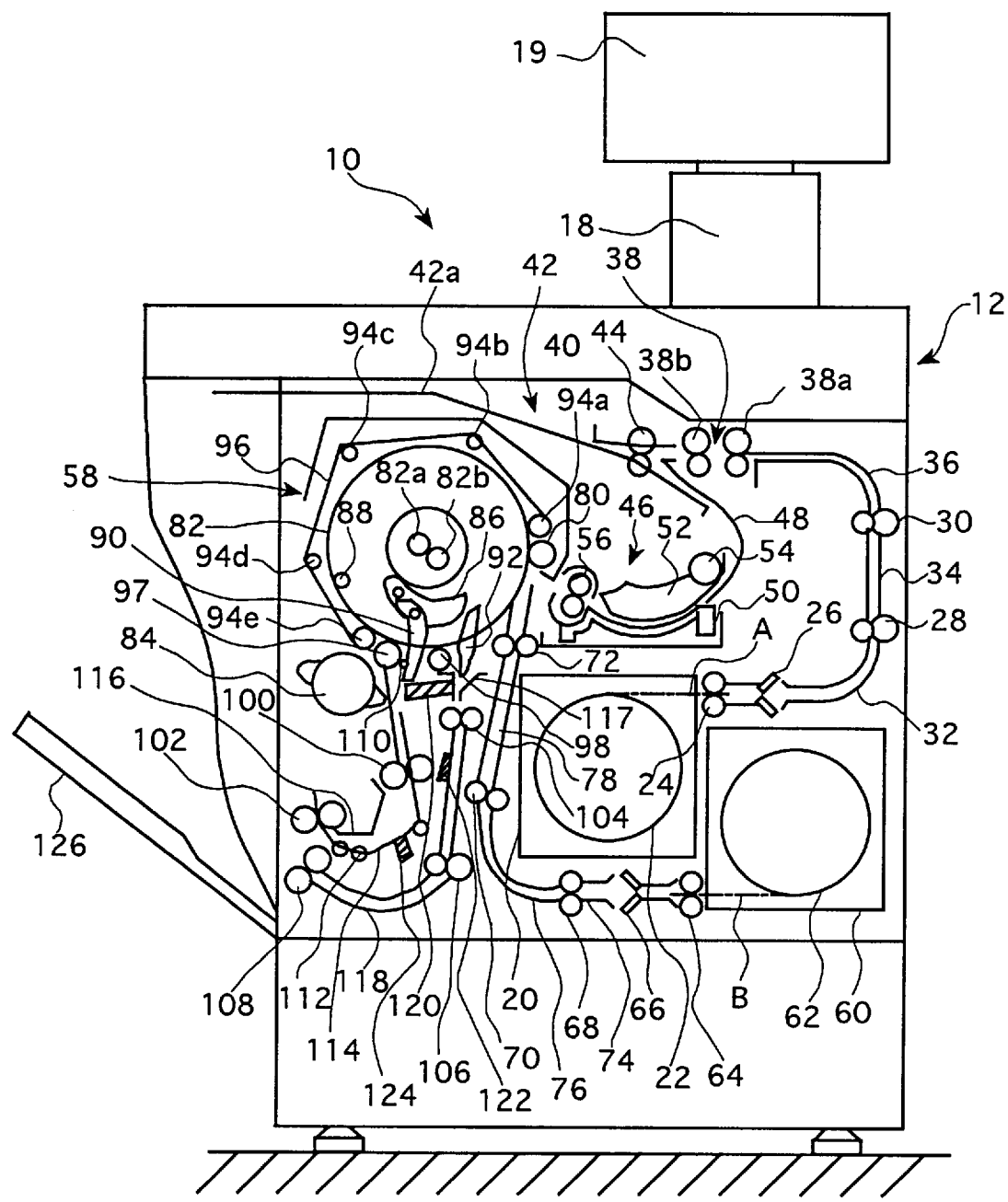
FIG. 2 is a simplified cross-sectional view showing the interior of the image recording apparatus shown in FIG. 1.
Figure 3:
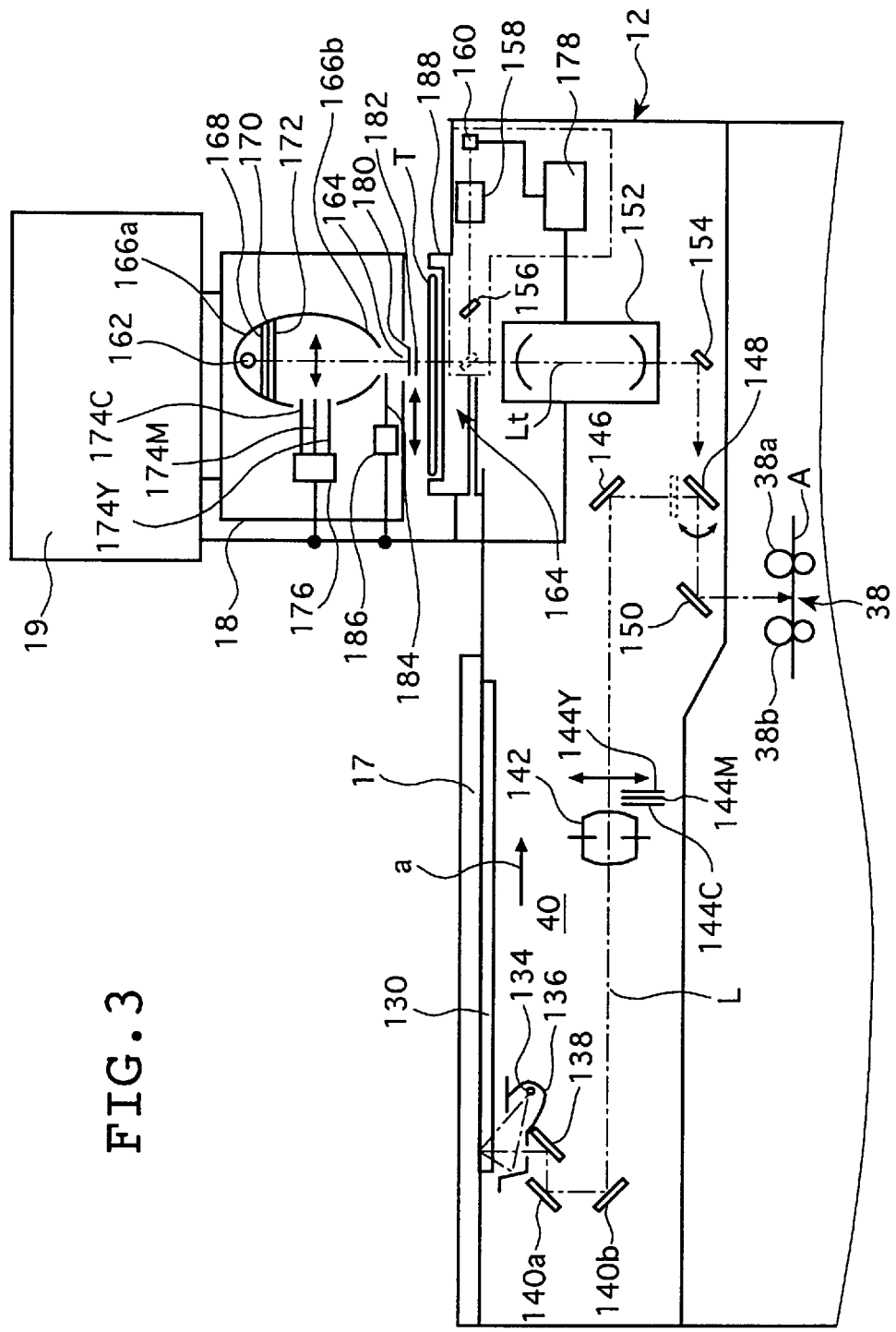
FIG. 3 is a simplified cross-sectional view showing the interior of the exposure unit in the image recording apparatus of FIG. 2, as well as the interior of a film scanning unit to which the apparatus of the invention for imagewise exposure is applied.

FIG. 1 is a perspective exterior view of one embodiment of the image recording apparatus which uses an apparatus for imagewise exposure implementing an example of the color correction control method of the present invention. FIG. 2 is a simplified diagrammatic cross-sectional view showing the interior of the image recording apparatus. FIG. 3 is a simplified diagrammatic cross-sectional view of the slit scanning exposure unit and the film scanning unit to which the apparatus of the invention for imagewise exposure is applied.

The image recording apparatus shown in FIG. 1 is an apparatus that uses as a recording medium a thermally processable (thermally developable or heat-developable) light-sensitive material that requires thermal development and which transfers and forms an image onto an image-receiving layer in an image-receiving material in the presence of an image-forming solvent such as water. Using this apparatus, not only the image on reflection-type originals such as printed matter and photographs but also the image on transmission-type positive originals such as 135 size lantern slides and proofs, as well as the image on transmission-type negative originals such as negative films can be recorded on either positive-positive or negative-positive light-sensitive materials as properly selected according to the specific type of original to be duplicated.

Examples of negative-positive light-sensitive materials include the one described in Unexamined Published Japanese Patent Application (kokai) Hei 6-242546, as well as those described in commonly assigned Unexamined Published Japanese Patent Applications (kokai) Hei 6-3479969, 7-219182 and 7-270993 and in commonly assigned Japanese Patent Applications Hei 6-219569, 6-219619, 6-219563 and 6-219575.

Examples of positive-positive light-sensitive materials include those described in Unexamined Published Japanese Patent Applications (kokai) Hei 6-161070 and 6-289555, as well as those described in commonly assigned Unexamined Published Japanese Patent Application (kokai) Hei 6-347967 and in commonly assigned Japanese Patent Applications Hei 6-243460 and 6-129621. However, these are not the sole examples of negative-positive and positive-positive light-sensitive materials that can be used in the present invention.

The light-sensitive materials which can be used on the image recording apparatus of the present invention may be of any types of light-sensitive materials that are capable of forming latent image by imagewise exposure and processing it by a predetermined procedure to produce a visible image. Hence, light-sensitive materials that may be used are exemplified by conventional types of color photographic materials (e.g. negative films, reversal films and color photographic papers), color diffusion transfer light-sensitive materials, thermally processable color photographic materials and light- and pressure-sensitive color photographic materials.

If a positive image is to be formed from a positive original including the reflection-type original such as the printed matter and the photograph, and the transmission-type positive original such as the lantern slide and reversal film, so-called "positive-positive" light-sensitive materials may specifically be used; if a positive image is to be formed from a negative original including the transmission-type negative original such as the negative film and negative document, so-called "negative-positive" light-sensitive materials should be used.

The image recording apparatus generally shown by 10 in FIG. 1 in box-shaped and comprises a body (housing) 12 that has a front door 14 and a side door 16. To have the interior of the apparatus exposed, these doors may be opened. Each door is provided with a safety system using a so called "interlock mechanism" (not shown) that turns off power to specified areas, the moment the doors are opened.

The image recording apparatus 10 is fitted on the top (left side in FIG. 1) of the body 12 with a detachable platen cover 17 for pressing the original located on a platen (a document platen) and on the top (right side in FIG. 1) of the body 12 with a detachable film scanning unit 18 for copying small-size transmission-type originals such as 135 size color negatives and lantern slides. When copying the image of a comparatively large transmission-type original such as a 4×5 size lantern slide, a proof and a sleeve, the platen cover 17 is removed or opened, and a dedicated light source unit is placed on top of the image recording apparatus in a predetermined position in such a way that it covers the upper side of the platen.

Positioned on top of the body 12 of the image recording apparatus 10 and behind the film scanning unit 18 is a monitor 19 that displays an original image as read by a line sensor 160 (to be described later) prior to exposure of the thermally processable light-sensitive material.

The image recording apparatus 10 has a light-sensitive material magazine 20 positioned in the lower part of the center of the body 12 as shown in FIG. 2. The magazine 20 contains a roll 22 of a thermally processable light-sensitive material A. The thermally processable light-sensitive material A as contained in the magazine 20 is wound on itself in such a way that its light-sensitive surface (its exposure surface) faces down in case of withdrawing it. An exit of the thermally processable light-sensitive material A is formed at the right upper portion of the light-sensitive material magazine 20 as seen in FIG. 2. A roller pair 24 for withdrawing and transporting the thermally processable light-sensitive material A from the magazine 20 is positioned near the exit.

A cutter 26 is positioned downstream of the roller pair 24 in the direction of the transport of the thermally processable light-sensitive material A (the term "downstream" as used hereinafter shall always be referred against the transport of the light-sensitive material). The cutter 26 will cut the thermally processable light-sensitive material A to a predetermined length after it has been withdrawn out of the magazine 20. The cutter 26 consists typically of a fixed blade and a moving blade. The moving blade is moved up and down by a known means such as a cam to engage the fixed blade for cutting the thermally processable light-sensitive material A.

After the cutter 26 was activated, the withdrawing roller pair 24 will rotate in a reverse direction, thereby transporting the thermally processable light-sensitive material A backward up to a position where it barely grips the front end portion of the thermally processable light-sensitive material A. After it has been transported backward, the withdrawing roller pair 24 may release it so that its leading end portion will not be damaged.

Transport rollers 28 and 30 and transport guide plates 32, 34 and 36 are positioned downstream of the cutter 26 so as to transport the thermally processable light-sensitive material A upward to an exposing section 38. The exposing section 38 is provided between transport roller pairs 38a and 38b and equipped with an exposure unit 40 on its top. In the illustrated image recording apparatus 10, the thermally processable light-sensitive material A is transported through the exposing section 38 as it is held in a predetermined position by means of transport roller pairs 38a and 38b and the transported light-sensitive material A is subjected to slit scan exposure by means of slit light that carries the original image information from the exposure unit 40 or film scanning unit 18.

Description of the exposure unit 40 and the film scanning unit 18 will be given later.

A switchback section 42 having a transport guide plate 42a and a transport roller pair 44 is provided alongside the exposing section 38. A water applicator section 46 is provided below the exposing section 38.

The thermally processable light-sensitive material A that has been withdrawn out of the magazine 20 and that has been transported to the exposing section 38 where it is imagewise exposed is brought into the switchback section 42 by means of the roller pair 44 and the guide plate 42a. Then, the roller pair 44 rotates in reverse direction so that the light-sensitive material A is ejected from the switchback section 42 and guided by a transport guide plate 48 to be transported to the water applicator section 46.

The water applicator section 46 has an application tank 50 filled with an image forming solvent and a guide member 52 that is positioned in a face-to-face relationship with the tank 50. A supply roller 54 for bringing the thermally processable light-sensitive material A into the tank 50 is positioned at an end of the water applicator section 46 which is upstream of the tank 50, and a squeeze roller pair 56 for removing excess water from the light-sensitive material A is positioned at the other end of the water applicator section 46 which is downstream of the tank 50.

The thermally processable light-sensitive material A that has been exposed in the exposing section 38 is driven by the supply roller 54 to pass between the application tank 50 and the guide member 52 as it is coated with water which is an image forming solvent. Thereafter, the light-sensitive material A is passed through the squeeze roller pair 56 so that it is freed of excess water.

The underside of the application tank 50, namely, the side that is opposite the surface of the thermally processable light-sensitive material A which is to be exposed, is provided with a plurality of ribs that are inclined with respect to the direction of transport of the light-sensitive material A. These ribs not only reduce the frictional resistance that will develop when the light-sensitive material A passes through the tank 50, they also prevent the light-sensitive material A from being damaged in particular areas.

On the other hand, the guide member 52 made of a metallic material such as aluminum is pivotablly supported coaxially with the supply roller 54 in such a way that it can contact and depart from the application tank 50.

A thermal development and transfer section 58 is positioned downstream of the water applicator section 46. The thermally processable light-sensitive material A coated with water and freed of excess water by means of the squeeze roller pair 56 is sent to the thermal development and transfer section 58.

An image-receiving material magazine 60 is positioned to the right of the magazine 20 as seen in FIG. 2. The magazine 60 contains a roll 62 of an image-receiving material B. The image-receiving material B as contained in the magazine 60 is wound on itself in such a way that its surface where image is to be transferred faces up. The image-receiving material B is formed in a smaller width (dimension in the direction perpendicular to the transport direction) than the thermally processable light-sensitive material A in order to insure that the two members can be easily separated after the thermal development which will be descried hereinafter.

An exit of the image-receiving material B is formed at the left upper portion of the image-receiving material magazine 60 as seen in FIG. 2. A withdrawing roller pair 64 for withdrawing and transporting the image-receiving material B is positioned near the exit of the magazine 60. After the image-receiving material B is withdrawn by the withdrawing roller pair 64, it releases the image-receiving material B so that its leading end portion will not be damaged.

A cutter 66 is positioned downstream of the roller pair 64 so that it cuts the image-receiving material B to a predetermined length after it has been withdrawn out of the magazine 60. The cutter 66 consists typically of a fixed blade and a moving blade. The moving blade is moved up and down by a known means such as a cam to engage the fixed blade for cutting the image-receiving material B. It should be mentioned here that the image-receiving material B is cut to a shorter length than the light-sensitive material A in order to insure that the two members can be easily separated after the thermal development which will be descried hereinafter.

Positioned downstream of the cutter 66 are transport roller pairs 68, 70 and 72, and transport guide plates 74, 76 and 78; the image-receiving material B that has been cut to a predetermined length is transported from below the magazine 20 to go upward so that it is brought into the thermal development and transfer section 58. The transport roller 72 also serves as a registration roller for correcting any "skew" of the image-receiving material B that may have occurred as a result of transport. The "skew" corrected image-receiving material B is thus brought into the thermal development and transfer section 58.

A laminating roller 80 for bringing the thermally processable light-sensitive material A and image-receiving material B into a unitary assembly is positioned downstream of the squeeze roller pair 56 and the transport roller pair 72. The laminating roller 80 has its circumference covered with silicone rubber (e.g. with a thickness of 2.53 mm and a hardness of ca. 40 degrees) and is urged at both axial ends with a predetermined force (e.g. about 9 kg) so that it is in pressure-contact with a heating drum 82 in the thermal development and transfer section 58. It is coupled to a drum motor 84 by a known driving force transmission system (not shown) so that the driving force of the motor 84 is transmitted to the roller 80 for rotating it.

In the illustrated image recording apparatus 10, the thermally processable light-sensitive material A and the image-receiving material B are transported by the squeeze roller pair 56 and the transport roller pair 72 at a speed slightly (say, about 2%) slower than they are transported by the laminating roller 80; thus, the thermally processable light-sensitive material A and the image-receiving material B are subjected to some back tension as they are transported by the laminating roller 80.

The thermally processable light-sensitive material A is brought into the gap between the laminating roller 80 and the heating drum 82 by means of the squeeze roller pair 56. Except that the light-sensitive material A precedes the image-receiving material B by a predetermined length, the transport of the two members is synchronous and the image-receiving material B is likewise brought into the gap between the laminating roller 80 and the heating drum 82 so that it is placed in a superposed relationship with the light-sensitive material A.

As already mentioned, the light-sensitive material A is slightly longer than the image-receiving material B not only in the widthwise direction but also in the longitudinal (transport) direction and, hence, when superposed, the four sides of the former will project beyond the latter.

A cam 86 and a feeler 88 are fixed to a lateral side of the heating drum 82 in the thermal development and transfer section 58. Cam 86 is adapted to be engageable with stripping fingers 90 and 92 (to be described later) on the heating drum 82 and as it rotates, the cam 86 engages the fingers 90 and 92 successively to pivot them. Feeler 88 is used to check whether the heating drum 82 is in registry with each of the light-sensitive material A and the image-receiving material B.

A pair of halogen lamps 82a and 82b are contained in the heating drum 82. The two halogen lamps 82a and 82b produce different powers, say, 400 W and 450 W, for heating the surface of the drum 82 to a predetermined temperature (e.g. 82° C.). In the illustrated image recording apparatus 10, both lamps are used to heat the drum 82 to the predetermined temperature but lamp 82a alone is used during the steady-state operation after the predetermined temperature has been reached.

An endless belt 96 is wound around the heating drum 82 as it is stretched on five rollers 94a, 94b, 94c, 94d and 94e. The endless belt 96 comprises a woven fabric material covered with rubber. The four rollers 94a–94d are made of stainless steel whereas the roller 94e is made of rubber. The outside surface of the endless belt 96 between the rollers 94a and 94e is in pressure-contact with the circumference of the heating drum 82.

The roller 94c has such a shape that both axial ends flare axially outward and, additionally, it is urged with a force of about 2 kg at both axial ends in a direction away from the heating drum 82. This is effective in holding the endless belt 96 at a constant tension so as to retain the force of its pressure contact with the heating drum 82 while preventing it from offsetting under rotation.

The rubber roller 94e is coupled to the drum motor 84 by means of a known driving force transmission system (not shown); hence, as the roller 94e rotates in the illustrated image recording apparatus 10, the endless belt 96 is rotated and the rotational force is transmitted to the heating drum 82 by the force of friction between the endless belt 96 and the heating drum 82, which in turn rotates.

The known driving force transmission system (not shown) allows the drum motor 84 to drive a plurality of driven parts in unison, including roller 94e, laminating roller 80, squeeze roller pair 56, as well as the following components to be described later: a bending guide roller 97, a stripping roller 98, light-sensitive material ejecting roller pairs 100 and 102, and image-receiving material ejecting roller pair 104, 106, and 108.

The thermally processable light-sensitive material A and the image-receiving material B that have been combined by the laminating roller 80 are transported as they are held in the superposed relationship between the heating drum 82 and the endless belt 96 so that they travel over a distance equal to about two-thirds of the circumference of the heating drum 82 (between rollers 94a and 94e). In the illustrated apparatus 10, the rotation of the heating drum 82 (hence, the rotation of the roller 94e) is ceased as the thermally processable light-sensitive material A and the image-receiving material B are completely confined between the heating drum 82 and the endless belt 96 so that they are heated for a predetermined time. In the illustrated case of image formation, the thermally processable light-sensitive material A is heated to release mobile dyes while, at the same time, the released dyes are transferred onto the dye-fixing layer in the image-receiving material B so that a visible image is formed on the image-receiving layer in the image-receiving material B.

Bending guide roller 97 is positioned downstream of the roller 94e in the direction of the rotation of the drum 82; this is a roller made of silicone rubber and pressed against the circumference of the heating drum 82 under a predetermined force. The thermally processable light-sensitive material A and the image-receiving material B that have been transported by the heating drum 82 and the endless belt 96 will be further transported by the bending guide roller 97.

Stripping finger 90 and a pinch roller 110 are positioned downstream of the guide roller 97. Stripping finger 90 is pivotally supported on a shaft and it is allowed to pivot under the action of the cam 86 so that it can contact or depart from the surface of the heating drum 82. The pinch roller 110 is normally held against the bending guide roller 97 at a predetermined pressure and adapted in operative association with the pivoting of the stripping finger 90 in such a way that when the latter contacts the heating drum 82, the roller 110 will get clear of the guide roller 97.

When both the light-sensitive material A and the image-receiving material B have been transported to the position of stripping finger 90, the cam 86 works to have the finger contact the heating drum 82 and the front end of the light-sensitive material A which has been superposed on the image-receiving material B after a predetermined length of lead engages the finger 90, which then strips the light-sensitive material A from the surface of the heating drum 82.

When the front end of the light-sensitive material A is stripped from the heating drum 82 by the predetermined length, the cam 86 works to get the finger 90 clear of the heating drum 82 while, at the same time, the pinch roller 110 contacts the guide roller 97 so that the stripped front end of the light-sensitive material A is held between the two rollers 110 and 97. Hence, the light-sensitive material A which has been stripped from the heating drum 82 is transported downward as it is held between the pinch roller 110 and the bending guide roller 97.

Light-sensitive material ejecting roller pairs 100 and 102, a plurality of guide rollers 112 and a transport guide plates 114 are positioned downstream of the pinch roller 110 and guide roller 97; these members and guide plates are so adapted that the light-sensitive material A which has been stripped from the heating drum 82 is transported first downward, then to the left as seen in FIG. 2 so that it is ejected into a scrap light-sensitive material stack box 116.

The light-sensitive material ejecting roller pairs 100 and 102 are so adapted that they transport the thermally processable light-sensitive material A at a speed about 1–3% slower than the peripheral speed of the rotating heating drum 82 so that the light-sensitive material A will not be subjected to unnecessary tension. A drying fan 124 is positioned near the transport guide plate 114 to accelerate the drying of the thermally processable light-sensitive material A.

Stripping roller 98 and stripping finger 92 are positioned downstream of the guide roller 97 and stripping finger 90 in the direction of the rotation of the heating drum 82. Stripping roller 98 is made of silicone rubber having a surface roughness of at least 25S and is urged against the circumference of the heating drum 82 at a predetermined pressure so that it will rotate under the action of the drum motor 84 as already mentioned a few paragraphs ago. On the other hand, the stripping finger 92 is so adapted that it will pivot under the action of the cam 86 to either contact or depart from the circumference of the heating drum 82.

If the light-sensitive material A is stripped from the heating drum 82 and when only the image-receiving material B is transported around the drum 82, the cam 86 works to have the stripping finger 92 contact the drum 82, thereby stripping the front end of the image-receiving material B. At the same time, the stripping roller 98 and the stripping finger 92 contact the heating drum 82 and guide the image-receiving material B to bend downward for further transport.

Image-receiving material ejecting roller pairs 104, 106 and 108, as well as transport guide plates 117 and 118 are positioned downstream of the strip roller 98 and the image-receiving material B which has been stripped from the heating drum 82 is transported first downward, then to the left as seen in FIG. 2 so that it is ejected onto a tray 126 fixed on the left side of the housing 12.

A drum fan 120 is positioned near the transport guide plate 117 so that it will accelerate the drying of the image-receiving material B as it is heated by the heating drum 82. It should be noted that the drum fan 120 is not operated unless it is necessary depending on the specific conditions of the surrounding atmosphere in order to assure uniformity in the temperature distribution of the heating drum 82.

Additionally, a ceramic heater 122 is provided on the transport guide plate 118 to further promote the drying of the image-receiving material B. The ceramic heater 122 is set at a temperature of about 70° C.

The thermal development and transfer section 58 having the construction described above is configured as an integral unit when taken as a whole and it is adapted to be pivotal in a direction that is opposite to the water applicator section 46 with respect to the body 12. Hence, if jamming or other troubles occur, the user may first open the side door 16 on the body 12, then open and move the thermal development and transfer section 58, and take the necessary remedial action.

We now describe the exposure unit 40 and the film scanning unit 18 in the image recording apparatus 10 with reference to FIG. 3.

The exposure unit 40 provides exposure optics that is used primarily for copying the images of reflection-type originals such as printed matter and photographs, and those of comparatively large-size transmission-type originals such as proofs and lantern slides.

As FIG. 3 shows, a document platen 130 and a platen cover (document pressing plate) 17 are positioned on top of the body 12 of the image recording apparatus 10; the document platen 130 is used to carry a reflection-type original and typically made of transparent glass, and platen cover 17 is fitted as required to fix the reflection-type original on the platen 130 and may be removed if there is no need to use it.

When copying the image of a comparatively large-size transmission-type original such as a proof or a sleeve, the platen cover 17 is removed and a dedicated light source unit for illuminating the document on the platen 130 from above is mounted in a predetermined position.

Located below the document platen 130 is a light source unit which is an integral assembly of an exposing light source 134 to be used for copying the image of the reflection-type original, a reflector 136 and a mirror 138. In the illustrated apparatus, the reflector 136 also serves as a slit defining member that restricts the width, taken in the scanning direction, of reflected light from the reflection-type original (or transmitted light through a transmission-type original) after issuing from the light source 134.

The light source unit under consideration moves beneath the platen 130 in the scanning direction indicated by arrow a so that the reflection-type original is illuminated with light from the light source 134. It should be mentioned here that when copying a large-size transmission-type original using a dedicated light source unit, the light source 134 is not lit but the light source unit is simply moved to scan the underside of the platen 130, whereupon the transmitted light from the transmission-type original passes through the slit.

The light issuing from the light source 134 is reflected by the reflection-type original, passes through the slit and is reflected by the mirror 138 to travel in a predetermined direction. The reflected light is then admitted into a mirror unit which is an integral assembly of two mirrors 140a and 140b and by which the light traveling in the optical path L is reflected in predetermined directions. The mirror unit is adapted to move in the same direction as the above-mentioned light source unit but at one half its speed.

Located downstream of the mirror unit in the optical path L is a lens unit 142 which is an integral assembly of an imaging lens and a variable diaphragm for adjusting the quantity of light (i.e., density). The variable diaphragm consists typically of two light-shielding plates that are opposed to each other in a direction perpendicular to the optical path L and which can be inserted into or removed from the optical path as required. The quantity of reflected light is controlled by adjusting the gap between the two light-shielding plates.

A color filter unit for adjusting color balance is positioned downstream of the lens unit 142. The color filter unit may be composed of three color filter plates, namely, a Y (yellow) filter 144Y, a M (magenta) filter 144M and a C (cyan) filter. The color balance of reflected light is controlled by adjusting the amount in which each of the three color filter plates is inserted into the optical path L.

Located downstream of the color filter unit in the optical path L are three mirrors 146, 148 and 150 for causing the reflected light to be reflected in predetermined directions. The oncoming reflected light in the optical path L is further reflected in predetermined directions by those mirrors and keeps traveling in the optical path L until it reaches the exposing section 38, where it is focused for exposure of the thermally processable light-sensitive material A in the process of scanning transport.

The mirror 148 is adapted to be pivotal; for copying reflection-type originals and large-size transmission-type originals using the exposure unit 40, the mirror 148 takes the position indicated by a solid line in FIG. 3 and for copying a small-size transmission-type T such as a color negative film using the film scanning unit 18, the mirror 148 moves to the position indicated by a dashed line in FIG. 3.

The exposure unit 40 is also fitted with an image sensor (not shown) that measures the quantity of reflected light for the respective colors, red (R), green (G) and blue (B). The image sensor reads the original image in a prescanning step and determines the amount by which variable diaphragm in the lens unit is to be inserted into the optical path L, as well as the amounts by which the respective color filter plates in the color filter unit are to be inserted into the optical path L.

As already mentioned, the illustrated image recording apparatus 10 is also capable of copying small-size transmission-type originals such as color negative films of a 135 size and a 120 size and lantern slides; it has the film scanning unit 18 mounted detachably on top of the right portion of the body 12 to provide exposure optics for copying the image of transmission-type original T. The film scanning unit 18 is such that an apparatus for imagewise exposure implementing the color correction control method of the invention is applied thereto. The exposure unit 40 lying below the film scanning unit 18 accommodates the following components: a zoom lens 152 and a mirror 154 that compose exposure optics for performing slit scan exposure on the transmission-type original T, as well as a moving mirror 156, imaging lens 158 and a line sensor 160 for measuring the quantity, color, etc. of transmitted light through the transmission-type original T.

The film scanning unit 18 illuminates the transmission-type original T with light from the source 162 as it moves in synchronism with the transport of the thermally processable light-sensitive material A. The light transmitted through the original T and the slit 164 in that order is projected onto the light-sensitive material A as enlarged with zoom lens 152 at a magnification of 200–850%, whereby the light-sensitive material A is exposed to the transmitted light from the original T for copying the image of that original.

The light source 162 may be of any type that is suitable for color reprography, as exemplified by a halogen lamp and a flash lamp. Located above the light source 162 is a reflector 166a by which the light from the source 162 is reflected toward the original T, and located below the light source 162 is a reflector 166b that is opposed to the reflector 166a so an even higher optical efficiency is achieved. The bottom end of the reflector 166b has an opening through which light can pass.

Located downstream of the light source 162 along the optical path Lt are an IR cut filter 168, a UV cut filter 170 and a B–G notch filter 172 for separating blue light from green light.

Located downstream of the B–G notch filter 172 is a filter section that adjusts the color balance of the light illuminating the transmission-type original T and, hence, the color balance of the image to be formed. The filter section is composed of three color filter plates, Y filter 174Y, M filter 174M and C filter 174C, and a drive unit 176 which allows the respective filters to be inserted into the optical path Lt.

The drive unit 176 comprises basically a drive source such as a pulse motor and known moving (transmission) means such as a rack and pinion. In order to set the conditions for image formation and in accordance with the amount of color adjustment to be performed by the user, as well as with the amount of color adjustment as determined by the modified conditions for exposure from the transmission-type original T, the drive unit 176 moves the respective color filter plates so that they are inserted into the optical path Lt by the amounts as set correctly by the color correction control method of the invention. Thus, the respective color filter plates adjust the color balance of the light illuminating the transmission-type original T, or the light exposing the thermally processable light-sensitive material A, whereby the color balance of the final image to be formed is adjusted.

A variable diaphragm 184 as the light control means of the invention for adjusting the quantity (intensity) of the light illuminating the transmission-type original T (namely, the exposing light) is positioned at the opening below the reflector 166b located downstream of the filter section. The variable diaphragm 184 is fitted with a drive unit 186. The variable diaphragm 184 is composed of light-shielding plates, a ND filter having a density gradient or the like. In the illustrated apparatus, the unit 186 controls the quantity of light by adjusting the amount in which the variable diaphragm 184 is to be inserted into the optical path Lt.

The drive unit 186 has the same construction as the drive unit 176. In order to set the conditions for image formation and in accordance with the amount of density adjustment to be performed by the user, as well as with the amount of density adjustment as determined by the modified conditions for exposure from the transmission-type original T, the drive unit 186 moves the variable diaphragm 184 to adjust the amount by which it is inserted into the optical path Lt. Thus, the amount of exposure to be given to the thermally processable light-sensitive material A, hence, the density of the image to be finally formed is adjusted.

The amounts by which the respective color filter plates are inserted into the optical path by means of the drive unit 176 are determined by a control unit 178 which is the color correction control means of the invention in accordance with the color correction control method of the invention. The amount by which the variable diaphragm 184 is inserted into the optical path by means of the drive unit 186 is also determined by the control unit 178.

A slit-defining member 164, a diffusion glass 180 and a Fresnel lens 182 are positioned downstream of the variable diaphragm 184. The member 164 determines the width of the slit through which light passes to expose the thermally processable light-sensitive material A. The diffusion glass 180 and the Fresnel lens 182 diffuse and mix the rays of light that has been color adjusted in the filter section and adjusted for the quantity of light (density) by the variable diaphragm 184 so as to create uniform light that is free from the problem of unevenness in colors and illumination and which falls on the transmission-type original T normal to it.

The transmission-type original T is placed on a scan table 188 located downstream of the Fresnel lens 182. The scan table 188 holds the transmission-type original T in a predetermined position and the original T is scanned by transporting it in the directions indicated by the two-headed arrow in FIG. 3 in synchronism with the transport of the light-sensitive material A in the exposure unit 40.

The method of moving the transmission-type original T over the scan table 188 is in no way limited and any known transport means such as thread transmission, wrapping transmission (pulley and endless belt) or a rack and pinion adjustment may be effectively used. The moving speed of the original T is one nth of the transport speed of the thermally processable light-sensitive material A, with n being the copy ratio that is achievable by the film scanning unit 18.

The transmitted light that has passed through the transmission-type original T travels in the optical path Lt to be admitted into the zoom lens 152 located within the exposure unit 40. The transmitted light from the original T which has passed through the slit 164 undergoes magnification to 200%–850% by means of the zoom lens 152 to form an image at the exposing position in the exposing section 38.

The transmitted light from the original T which has passed through the zoom lens 152 has its optical path deflected by the mirror 154 through an angle of about 90° so that it is brought into agreement with the optical path L of the reflected light from the reflection-type original before it falls on the mirror 150. As already mentioned, the mirror 148 pivots to the position indicated by a dashed line in FIG. 3 when the image of the transmission-type original T is to be copied using the film scanning unit 18.

As in the case of the reflected light from the reflection-type original, the transmitted light from the original T that has been reflected downward by the mirror 150 is focused at a predetermined exposing position on the thermally processable light-sensitive material A in the process of transport by the roller pairs 38a and 38b, so as to perform slit scan exposure on the material A.

It should be noted that the transmission-type original T is moved by the scan table 188 in synchronism with the scan transport speed of the light-sensitive material A, namely, at a speed which is one nth of the transport speed of the light-sensitive material A, with n being the factor of magnification by the projection optics. Hence, the whole image of the original T is scanned for exposure on the light-sensitive material A as the former is moved over the entire image region.

Prior to recording the image of the transmission-type original T, the illustrated apparatus performs prescanning without inserting the color filters 174Y, 174M and 174C, thereby reading the image of the original T to determine the amounts of C, M and Y correction and exposure for image recording, and thereafter, the amounts by which the three color filter plates (Y filter 174Y, M filter 174M, and C filter 174C) in the filter section should be inserted into the optical path Lt, and the amount by which the variable diaphragm 184 should be inserted into the optical path Lt are determined by the color correction control method of the invention.

As FIG. 3 shows, a mirror 156 is positioned upstream of the zoom lens 152 in such a way it can be inserted into or removed from the optical path Lt as required. During prescan, the mirror 156 is inserted into the optical path Lt as indicated by a dashed line in FIG. 3, whereby the transmitted light from the original T is deflected through an angle of 90°.

The transmitted light thus deflected in the optical path by the mirror 156 is adjusted for focus by means of the imaging lens 158 before it is admitted for imaging in the line sensor 160.

Figure 4:
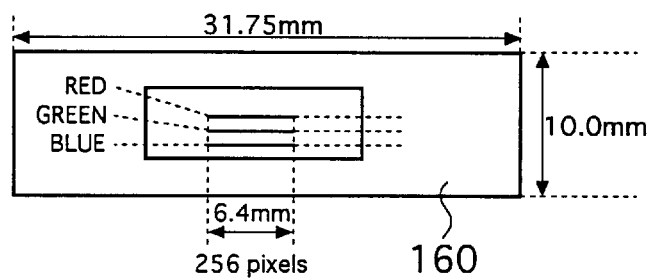
FIG. 4 is a plan view showing schematically the line sensor that is used in the optics for performing slit scan exposure in the image recording apparatus shown in FIG. 3.

As shown in FIG. 4, the line sensor 160 consists of three rows of line sensors, one having a R filter, the second having a G filter, and the third having a B filter. Each line sensor is typically a 256-pixel MOS (either NMOS or CMOS) line sensor which is capable of reading the image of transmission-type original T at a resolution of 256 pixels per line for each of the three primary colors R, G and B.

The output in the form of an image data signal from the line sensor 160 is forwarded to the control unit 178. Using the image signals that have been read by the line sensor 160, the control unit 178 displays a reproduced image on the monitor 19; at the same time, the control unit 178 determines image characteristic quantities from the acquired image signals so as to determine the conditions for proper exposure; if necessary, in response to the information on the position of the principal area as designated by the principal area designating means from the monitor image on the monitor 19 so as to determine the image characteristics of the principal area and modify the determined conditions for exposure; furthermore, if this is necessary, color and/or density manual adjustments may be added to the first determined conditions for exposure or the modified conditions for exposure so as to provide a third group of conditions for exposure; in accordance with the thus determined first group of conditions for exposure, the modified conditions for exposure or the third group of conditions for exposure including the manual color and/or density adjustments, the control unit 178 determines the necessary amounts of color and/or density adjustment, namely, the amounts of color correction and/or the amounts of density correction. On the basis of the thus determined necessary amounts of color correction, the control unit 178 calculates in accordance with the color correction control method of the invention the amounts by which color filters 174C, 174M and 174Y are to be inserted into the optical path Lt; alternatively, the amount by which the variable diaphragm 184 is to be inserted into the optical path Lt is first determined and in accordance with the thus determined amount, the amounts by which color filters 174C, 174M and 174Y are to be inserted into the optical path Lt are determined by the color correction control method of the invention. Thereafter, the information signals concerning the computed amounts of insertion are transmitted by the control unit 178 to the drive unit 176 for the color filter 174 and the control unit 186 for the variable diaphragm 184; the control unit 178 also controls the drive of not only the drive unit (not shown) for the scan table 188 and the other necessary parts of the illustrated image recording apparatus.

Figure 5:
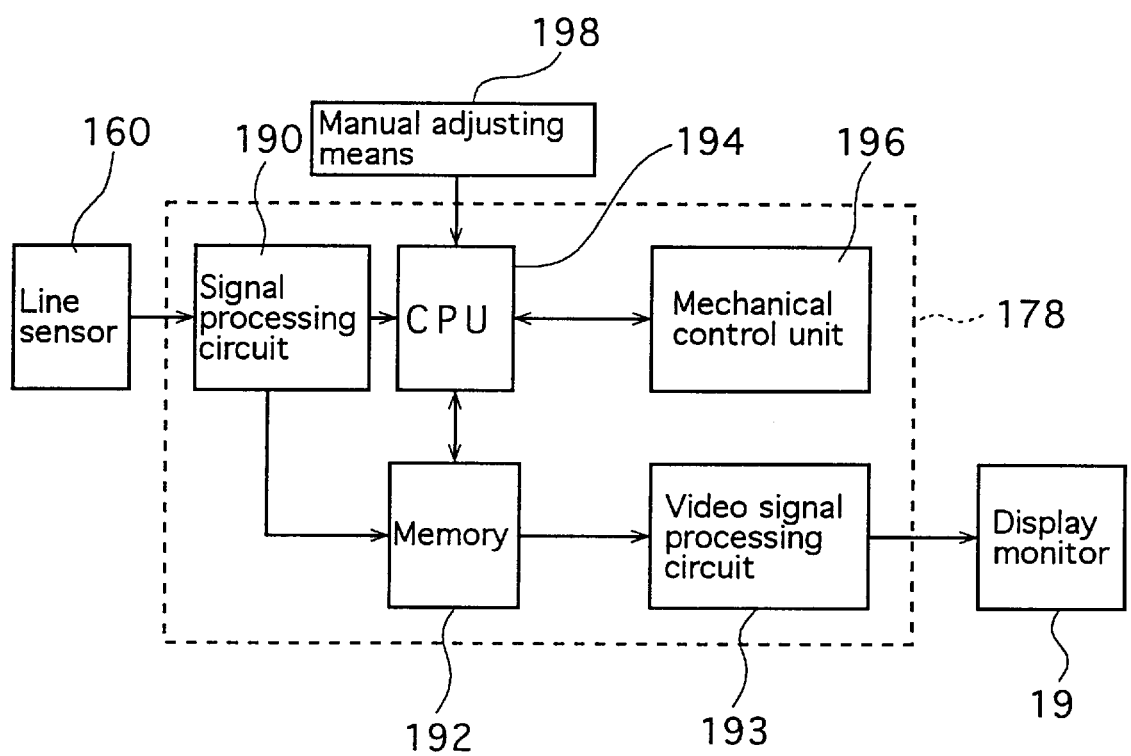
FIG. 5 is a simplified view showing the construction of the exposure control unit that is used in the optics for performing slit scan exposure in the image recording apparatus shown in FIG. 3.

The control unit 178 which is the color correction control means of the invention is as shown in FIG. 5 and comprises a signal processing circuit 190, a memory 192 containing seven color correction tables for each of the three primary colors used in the invention, a video signal generating circuit 193, a CPU 194 containing the computing sub-means of the color correction control means of the invention, and a mechanical control unit 196.

The signal processing circuit 190 performs various kinds of image signal processing, such as darkness correction, logarithmic transformation and light output correction, on the image signals that have been read by the line sensor 160. The circuit is controlled by the CPU 204.

The memory 192 which is used to implement the color correction control method of the invention comprises basically a memory (RAM) for storing a total of 21 color correction tables (seven for each of the three primary colors) which represent the relationships between the amounts of color correction and the amounts of insertion of the three color filters, a memory (RAM) for storing density correction tables which represent the amounts of density correction and the amount of insertion of the variable diaphragm 184, an imaging frame memory for producing a display on the monitor 19 and computing the exposure conditions (the amounts of color and density corrections) and other memories (ROM, RAM) which store the data necessary for controlling both the exposure optics (film scanning unit 18) and the synchronous transport line of the light-sensitive material.

The video signal processing circuit 193 receives the display image data signals from the imaging frame memory in the memory 192 and performs specified data processing on those signals, which are D/A converted to generate video signals, which are then transmitted to the monitor 19.

The monitor 19 is typically composed of a small-size LCD (liquid-crystal display); receiving the video signals generated by the video signal processing circuit 193, the monitor 19 reproduces and displays the original image with high fidelity for color and density. The monitor 19 has principal area designating means (e.g. mouse or keyboard) connected thereto so that the principal area of the original image (i.e., the most important subject in the original image, particularly, a human subject) can be designated from the reproduced image displayed on the monitor screen. It should be mentioned that the monitor 19 is by no means limited to a LCD but may be replaced by another display device such as a CRT.

CPU 204 which is the computing sub-means of the color correction control means of the invention is the essential part of the exposure control unit 178 and it performs all of the operations (see below) associated with the slit scan exposure from the transmission-type original T by means of the optics for slit scan exposure including the film scanning unit 18, as well as the synchronous transport line of the thermally processable light-sensitive material; e.g. the reading of the original image by prescanning, the processing of the image data thus obtained, the display of a reproduced image onto the monitor 19, computation of the conditions for exposure, correction of the conditions for exposure, optionally using the information on the position of the principal area as designated by the principal area designating means, adjustment of the unmodified or modified conditions for exposure by means of manual color and/or density adjusting means, and determining by the color correction control method of the invention the amounts by which filters 174Y, 174C and 174M and the variable diaphragm 184 should be inserted into the optical path Lt in accordance with either the amounts of color correction which are part of the thusly attained proper conditions for exposure (modified or adjusted values) or the amounts of color correction which correspond to the amount of insertion of the variable diaphragm 184 into the optical path Lt in accordance with the amount of density correction which is another part of the proper conditions for exposure. All of the data thus attained in the CPU 204 are thence transmitted to the mechanical control unit 206.

The mechanical control unit 206 supplies the drive unit 176 for the color filters 174Y, 174M and 174C in the optics for slit scan exposure and the drive unit 186 for the variable diaphragm 184 with the amounts by which the respective color filters 174Y, 174M and 174C and the variable diaphragm 184 are to be inserted into the optical path Lt; these amounts of insertion are supplied as the amounts of movement, for example, the number of steps if the drive units use a stepping motor as the drive source; at the same time, the mechanical control unit 206 performs slit scan exposure from the transmission-type original T including not only the scanning transport of the scan table 188 carrying the original T in both prescanning and subsequent scanning steps but also the synchronous transport of the thermally processable light-sensitive material A during scanning that follows prescanning. Thus, the mechanical control unit 206 controls the overall drive of the image recording apparatus 10 of the invention.

Having thus described the construction of the exposure control apparatus 178 which is the color correction control means for use in the invention, we now describe a specific example of the color correction control method of the invention.

The seven color correction tables stored in the memory 192 for each of the three primary colors represent the changes in the quantities of R, G and B light components, namely, the amounts of correction of the respective colors that occur when three color filters 174C, 174M and 174Y are inserted into the optical path Lt by specified amounts in three different manners, the first being the case of inserting single color filters, the second being the case of inserting any two filters in combinations and the third being the case of inserting the three filters simultaneously. Thus, the following seven color correction tables are prepared for each of the three primary colors: i) the table from the movement of C filter 174C; ii) the table from the movement of M filter 174M; iii) the table from the movement of Y filter 174Y; iv) the table from the movement of both filters 174C and 174M; v) the table from the movement of both filters 174M and 174Y; vi) the table from the movement of both filters 174C and 174Y; and vii) the table from the movement of three filters 174C, 174M and 174Y.

A total of 21 color correction tables are newly constructed at the time of delivery from the manufacturing plant or updated when the light source 162 and other components of the film scanning unit 18 are to be replaced. To construct these color correction tables, the three color filters 174C, 174M and 174Y are inserted, either singly or in one of the combinations specified above, into the exposing optical path Lt from the light source 162 to the optical sensor 160 in the actual machine without setting the original T and the amount of correction of each color (the change in the quantity of light of that color) is measured with the optical sensor 160 at more than one point of insertion, typically, at 15–30 points, and the thus measured data on the amounts of color correction are stored in the memory 192 together with the data on the amounts of filter insertion. The amounts of color correction can be measured with the optical sensor 160 under the same conditions as in a prescan mode except that the original T is not set on the machine and that color filters 174C, 174M and 174Y are inserted into the optical path Lt either singly or in various combinations.

Figure 6:
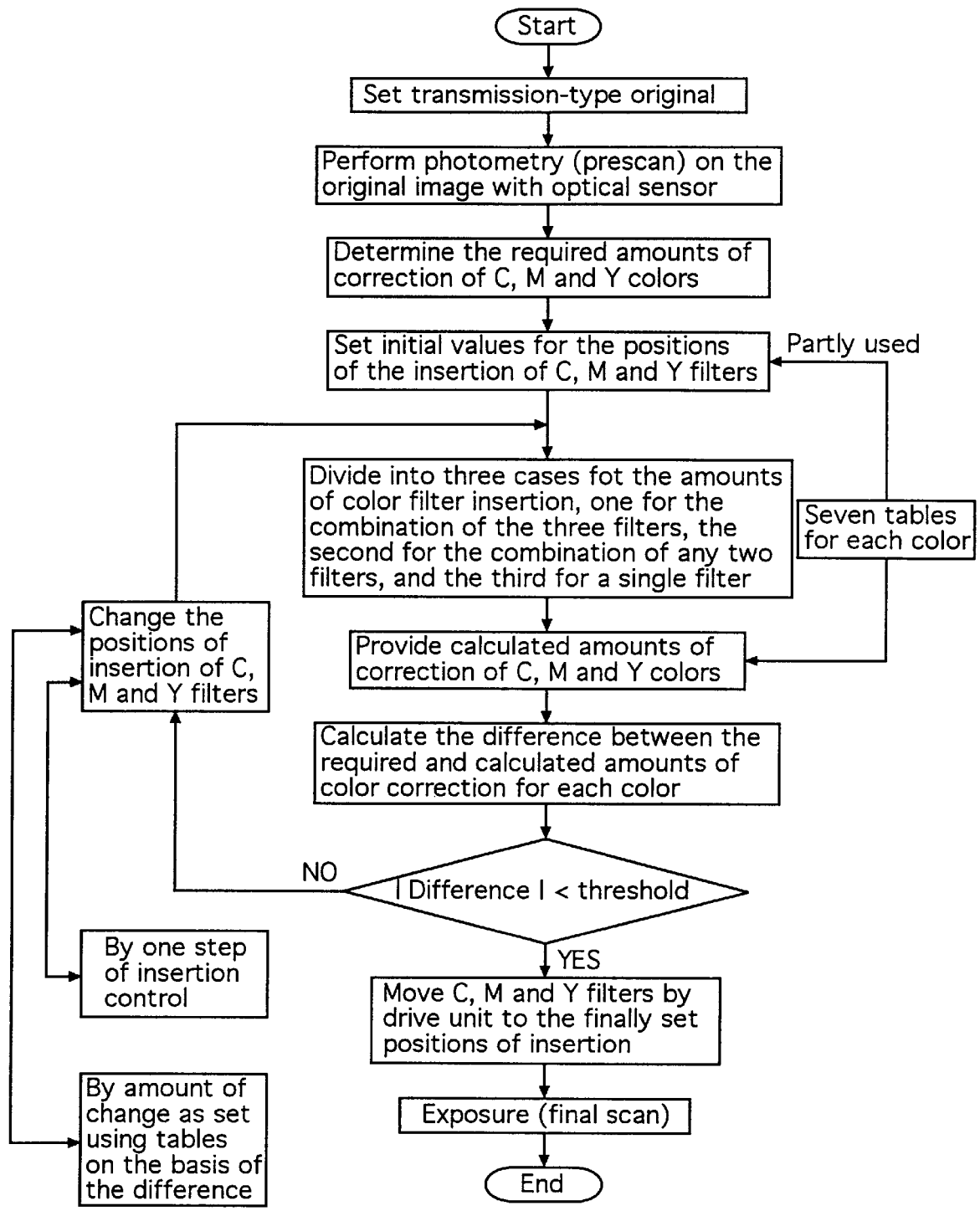
FIG. 6 is a flow chart for an embodiment of the color correction control method of the invention.

The procedure of image recording in accordance with the invention is shown by the flowchart in FIG. 6. First, the transmission-type original T is set on the scan table 188 of the scanning unit 18. Then, the moving mirror 156 is inserted into the optical path Lt to change it in such a way that the light from the source 162 is launched into the optical sensor 160. Prescanning is performed with the three color filters 174C, 174M and 174Y and the variable diaphragm 184 being retracted from the optical path Lt between the light source 162 and the optical sensor 160. The image data from the transmission-type original T are stored in the frame memory in the memory 192. The stored image data are used by the CPU 194 to determine the exposure conditions (which may be modified by the information on the principal area of the original image or subjected to manual adjustments) and, hence, the amounts of correction of the three primary colors C, M and Y.

With the amounts of color correction ($C_1$, $M_1$, $Y_1$) having been thusly determined, CPU 194 relies upon the color correction control method of the invention to precisely set the amounts (or positions) in which the three color filters 174C, 174M and 174Y are to be inserted into the optical path Lt.

Figure 7A:
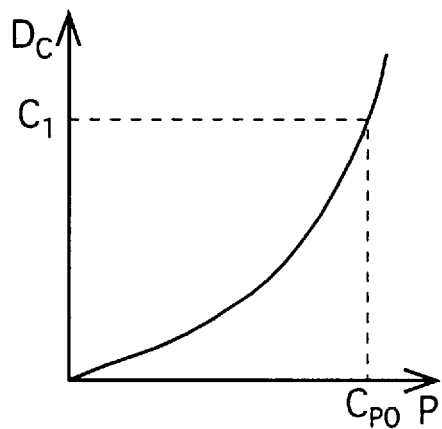
FIG. 7a is a graph showing an example of the relationship between the amount of insertion of a C filter and the amount of C correction (density)
Figure 7B:
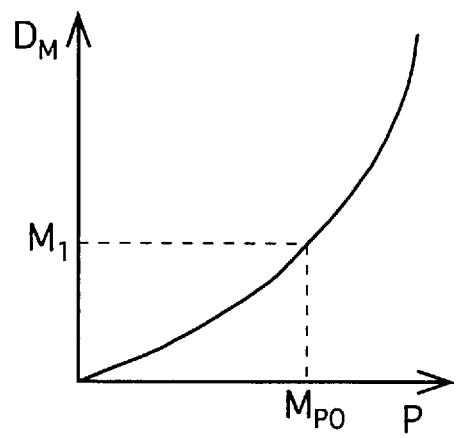
FIG. 7b is a graph showing an example of the relationship between the amount of insertion of a M filter and the amount of M correction (density)
Figure 7C:
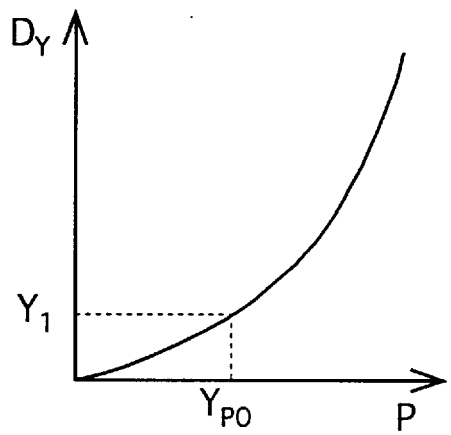
FIG. 7c is a graph showing an example of the relationship between the amount of insertion of a Y filter and the amount of Y correction (density)

The color correction control method of the invention starts with setting the initial values of the positions for the insertion of color filters 174C, 174M and 174Y (see FIG. 6). Stated more specifically, using the three color correction tables shown in FIGS. 7a–7c which refer to the insertion of single filters, CPU 194 determines Cpo, Mpo and Ypo which are the initial values (positions) for the filters 174C, 174M and 174Y to be inserted in order to meet the required amounts of color correction ($C_1$, $M_1$, $Y_1$) as shown in FIGS. 7a–7c. The illustrated case assumes Cpo>Mpo>Ypo for the sake of simplicity in explanation. It should also be noted that the method of setting the initial values (Cpo, Mpo, Ypo) is in no way limited to the use of color correction tables constructed by moving the color filters singly and they may be set using color correction tables constructed by moving two or three filters simultaneously. Alternatively, the conventional method of 3×3 matrix interpolation may be applied to these color correction tables. Thus, any known techniques may be employed to set the initial values Cpo, Mpo and Ypo.

Figure 8:
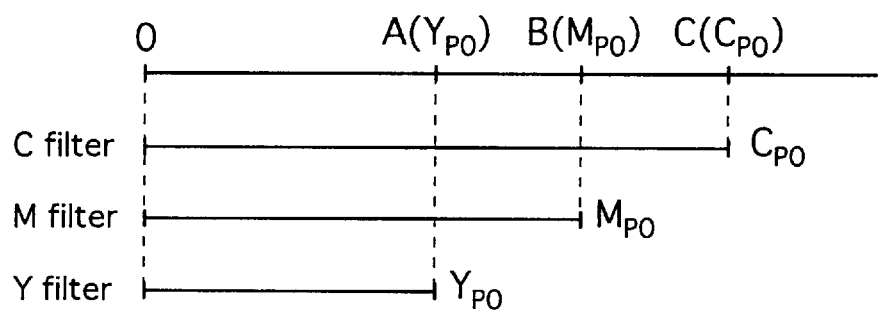
FIG. 8 is a diagram illustrating an example of the method by which the positions shown in FIG. 7 for the initial insertion of the C, M and Y filters are separated into three cases for the amount of filter insertion (or movement), one for the simultaneous movement of the three filters, the second for the simultaneous movement of any two of the filters, and the third for the movement of any single filter.

With the initial values Cpo, Mpo and Ypo being thusly determined for the insertion of the color filters 174C, 174M and 174Y, as shown in FIG. 8, CPU 194 performs position classification on the basis of those initial values so as to provide the following three cases: i) the positions (range) where the three color filters are inserted simultaneously as from position 0 to position A (Ypo) in the illustrated case; ii) the positions (range) where any two color filters, say, 174C and 174M are inserted simultaneously as from position A (Ypo) to position B (Mpo) in the illustrated case; and iii) the positions (range) where only one color filter, say, 174C is inserted as from position B (Mpo) to position C (Cpo) in the illustrated case. Using the color correction tables for these three cases in association with each of the three primary colors, CPU 194 provides the calculated amounts of color correction for the preset positions of the three color filters, Cpo, Mpo and Ypo. This can be done by the procedure shown in FIGS. 9a–9c, which illustrate the computation of the amounts of M correction as a typical case. The same procedure may be taken to compute the amounts of correction of other colors C and Y.

Figure 9A:
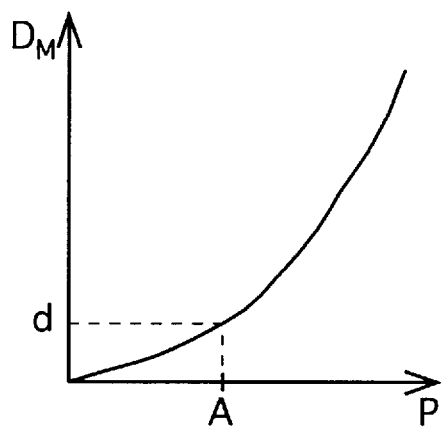
FIG. 9a is a graph showing an example of the amount of M correction (density) in relation to the amounts of insertion of C, M and Y filters as shown in FIG. 8.
Figure 9B:
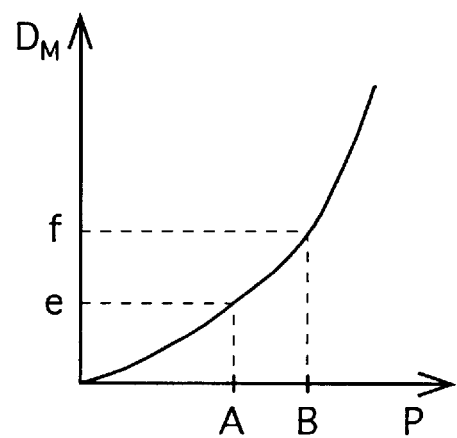
FIG. 9b is a graph showing an example of the amount of M correction (density) in relation to the amounts of insertion of C and M filters as shown in FIG. 8.
Figure 9C:
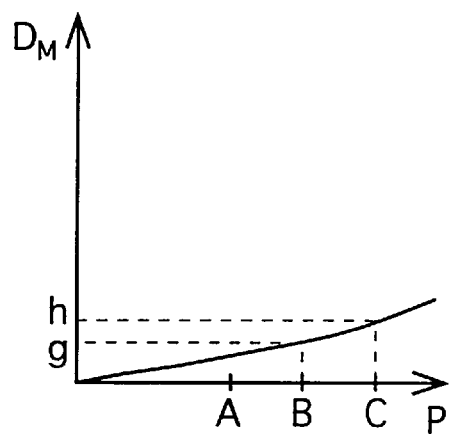
FIG. 9c is a graph showing an example of the amount of M correction (density) in relation to the amount of insertion of C filter as shown in FIG. 8.
Figure 12A:
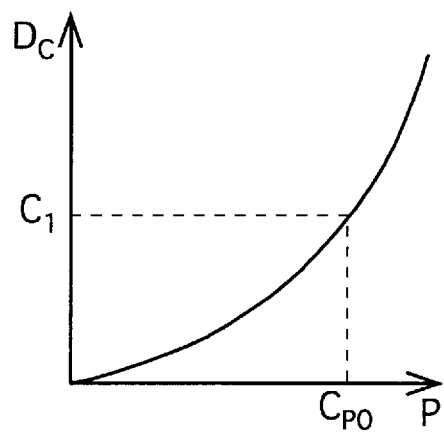
FIG. 12a is a graph showing the relationship between the amount of insertion of three color filters C, M and Y in combination and the amount of C correction (density) when color correction is controlled by a prior art method.
Figure 12B:
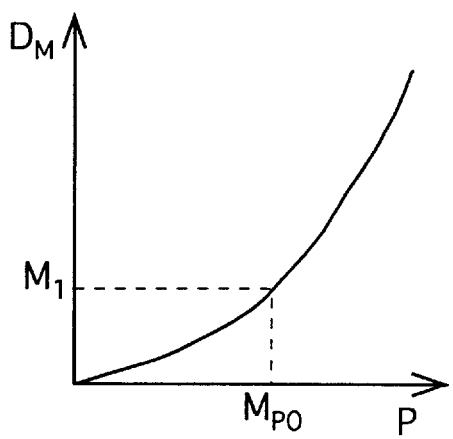
FIG. 12b is a graph showing the relationship between the amount of insertion of three color filters C, M and Y in combination and the amount of M correction (density) when color correction is controlled by the prior art method.
Figure 12C:
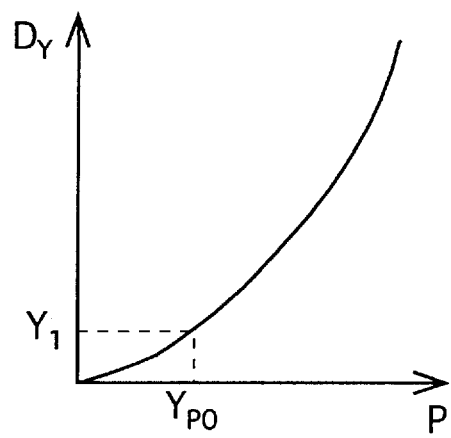
FIG. 12c is a graph showing the relationship between the amount of insertion of three color filters C, M and Y in combination and the amount of Y correction (density) when color correction is controlled by the prior art method.

Using the M correction table shown in FIG. 9a which is constructed by inserting the three color filters C, M and Y in combination, CPU 194 determines the amount of M correction d from position O to A. Similarly, using the M correction table shown in FIG. 9b which is constructed by inserting two color filters C and M, CPU 194 determines the amount of M correction (f–e) from position A to B whereas the CPU determines the amount of M correction (h–g) from position B to C using the M correction table shown in FIG. 9c which is constructed by inserting only one color filter C. Thus, the calculated amount of M correction $M_{a1}$ is determined by:

$$M_{a1}=d+(f-e)+(h-g).$$

The same procedure may be used to determine the calculated amounts of C and Y correction, $C_{a1}$ and $Y_{a1}$.

With the calculated amounts of color correction $C_{a1}$, $M_{a1}$ and $Y_{a1}$ being thusly determined, CPU 194 compares these calculated values with the respective required amounts $C_1$, $M_1$ and $Y_1$ to provide the differences ($\Delta_C$, $\Delta_M$, $\Delta_Y$), where $\Delta_C=|C_1-C_{a1}|$, $\Delta_M=|M_1-M_{a1}|$, and $\Delta_Y=|Y_1-Y_{a1}|$. If any one of the differences ($\Delta_C$, $\Delta_M$, $\Delta_Y$) is greater than the threshold i, the positions where the color filters 174C, 174M and 174Y have been inserted are changed (corrected). The method of doing this is typically shown in FIG. 10 with reference to the correction of M: Using the M correction table constructed by inserting the combination of three color filters C, M and Y, CPU 194 changes the current position of insertion Mpo by the amount corresponding to the difference $\Delta_M$ between the desired amount of correction $M_1$ and the calculated amount of correction $M_{a1}$, thereby providing a new position $M_{p1}$ for the insertion of color filter 174M. The same procedure may be taken to determine new positions $C_{p1}$ and $Y_{p1}$ for the insertion of color filters 174C and 174Y. The CPU then updates the contents of the preset values (Cpo, Mpo, Ypo) to the new positions of insertion ($C_{p1}$, $M_{p1}$, $Y_{p1}$) and these procedures are repeated until each of the differences ($\Delta_C$, $\Delta_M$, $\Delta_Y$) converges to a value less than the threshold.

The method of changing the amounts (or positions) of insertion of three color filters 174C, 174M and 174Y is in no way limited to the use of the color correction tables constructed by inserting the combination of the three color filters and either the color correction tables constructed by inserting single color filters or those constructed by inserting any two filters may also be employed. Alternatively, minimum controllable amounts of color filters may be used as unit amounts for inserting the filters progressively in such a direction that the desired amounts of color correction are eventually attained. One reason for the applicability of this approach is that even the initial values (Cpo, Mpo, Ypo) for the insertion of the color filters are already close to the values for the desired positions of insertion since they were preset with the aid of the color correction tables. In addition, the amount of correction of a particular color is affected by a far smaller degree by the change in the amounts of insertion of the filters for the other colors than by the change in the amount of insertion of the filter for that color and the effect of the former is typically about one tenth to one twentieth of the effect of the latter. Hence, changing the amount of filter insertion in minimum controllable amounts is sufficient for converging it to the desired amount of insertion and, hence, the desired amount of filter insertion can be easily determined.

While the threshold $\epsilon$ is not limited to any particular value, it is of no use in reducing the amount of insertion beyond the control limit of each color filter and, hence, the threshold is preferably set at the minimum controllable amount of each color filter. In this connection, the color filters 174C, 174M and 174Y used in the film scanning unit 18 which is the imagewise exposing apparatus of the invention can be controlled over ranges of, for example, about 1–100 cc or 1–120 cc, with the minimum controllable amount being safely set at 1 c. It should also be mentioned that the variable diaphragm 184 used in the invention can also be controlled over a range of, for example, about 1–120 cc, with the minimum controllable amount being safely set at 1 cc.

If the differences ($\Delta_C$, $\Delta_M$, $\Delta_Y$) are smaller than the preset values of the threshold $\epsilon$ for the respective colors, the relevant amounts of insertion (positions) (Cpo, Mpo, Ypo) of the three color filters 174C, 174M and 174Y are set as the amounts by which the respective filters should be inserted into the optical path during exposure. Thusly, the process of color correction control according to the invention is completed.

With the ultimate amounts of insertion (Cpo, Mpo, Ypo) of the three color filters having been thusly set, the drive unit 176 then moves the three color filters 174C, 174M and 174Y to the set positions within the optical path Lt. Thereafter, the drive unit 178 moves the mirror 156 to change the optical path Lt of exposing light such that it falls on the light-sensitive material A and the subsequent scan is performed to make imagewise exposure of the original T onto the light-sensitive material A.

This is how the color correction control method of the invention is implemented by CPU 194 in the control apparatus 178. In the illustrated case, the insertion of C, M and Y filters is divided into three cases, one of inserting the three filters, another of inserting any two filters and the third case of being inserting single filters, and the color correction tables for the respective cases are used to calculate the associated amounts of color correction, which are summed up to provide the calculated amounts of color correction. However, this is not the sole method of calculation that can be adopted in the invention and subtraction may be used in at least part of the calculation process. Referring to the case shown in FIG. 8, the three filters may simultaneously be inserted to either position B or C such that subtraction is used to provide the calculated amounts of color correction.

This alternative approach using subtraction is particularly preferred in the case where any two of the three color filters are inserted by substantially equal amounts as shown in FIG. 11*a* because there is assured a higher precision in the amounts of color correction that are provided in practice (by inserting the color filters). If both filters 174C and 174Y are inserted by the same amount Bo which is greater than the amount Ao by which the filter 174M is inserted as shown in FIG. 11*a*, Ao, or the amount by which the three filters are inserted in combination, may be added to the range from position Ao to Bo over which two filters are inserted in combination (see FIG. 11*b*); alternatively, the insertion of the three filters in combination is extended to position Bo as shown in FIG. 11*c* and the movement of M filter is assumed to be its withdrawal from position Bo to Ao and the amount of (Bo–Ao) is subtracted from the amount of (Bo–O). In this latter case, the sum of the movements of color filters from the position where the three filters are inserted in combination is smaller in the case of FIG. 11*c* than in FIG. 11*b*, causing a smaller effect on the light passing through the color filters; this would be the reason why the precision in the amounts of color correction that is actually provided is higher in the case of FIG. 11*c* than in FIG. 11*b*.

The foregoing description is dire ted to the case where the color correction control method of the invention is applied either at open aperture without inserting the stopdown mechanism (variable diaphragm 184) into the optical path Lt or with a certain degree of stopdown. It should, however, be noted that this is not the sole case of the invention and it may also be applied to the case where the stopdown mechanism is inserted into the optical path Lt to change the latter. If the variable diaphragm 184 affects the amounts of color correction by the insertion of three color filters 174C, 174M and 174Y, the method of the invention may be applied by using a total of 21 color correction tables (seven tables for each of the three primary colors) as described above under varying degrees of stopdown; in this case, the amount of color correction at a certain degree of stopdown for which no color correction table is available may be determined by interpolation from the two color correction tables associated with the neighboring degrees of stopdown.

In the above-described case, the color filters are three primary color filters C, M and Y but this is not the sole case of the invention and any other primary color filters may be used, as exemplified by R, G and B filters.

While the foregoing description concerns the case where the color correction control method of the invention is applied to exposure optics (film scanning unit 18) for exposing transmission-type originals, that is not the sole case of the invention and it may also be applied to exposure optics for exposing reflection-type originals, such as the exposing unit 40 in the illustrated case. The application of the color correction control method of the invention also is not limited to the case where an original image is recorded by exposure to a light-sensitive recording medium (a light-sensitive material or a photoreceptor)—where the method is applied to an apparatus for imagewise exposure in an image recording system; it may also be applied to the case where an original image is read with an optical sensor (e.g. CCD) and recorded on recording media such as a memory, a magnetic disk and an optical disk (the method is applied to an apparatus for imagewise exposure in an image reading system). In the latter case, electrical color correction may be applied after reading the original image and if the color correction control method of the invention is preliminarily applied to effect color correction by means of color filters, the optical sensor can be operated over a wide dynamic range, preferably over the full range, to insure the reproduction of an image of a very high quality and precision.

The image recording apparatus 10 which uses the apparatus for imagewise exposure implementing the color correction control method of the invention has basically the construction described above. We now describe the operation of this apparatus to copy the image of a transmission-type original T.

The operator first places the transmission-type original T on the scan table 188. After setting the copy ratio, the operator touches the START button. Then, the light source 162 turns on and the scan table 188 starts a prescan mode to scan the original T.

The light issuing from the source 162 passes through the IR cut filter 168, the UV cut filter 170 and the B–G notch filter 172 successively to be admitted into the original T, and the transmitted light carrying the image information from the original T passes through the slit 164. In this operating mode, the respective color filters 174Y–174C and the variable diaphragm 184 keep clear of the optical path Lt. Alternatively, they may be inserted into the optical path Lt in accordance with the standard conditions for exposure from the original T.

The transmitted light passing through the slit 164 is deflected through an angle of 90° by the moving mirror 156 which is inserted into the optical path Lt as indicated by a dashed line in FIG. 3 and then focused on the line sensor 160 by means of the imaging lens 158, where photometry is conducted for each of colors R, G and B; thus, the image of the original T is separated into the three primary colors R, G and B and read for each of these colors at a resolution of 256 pixels per line.

The output from the line sensor 160 is forwarded to the control unit 178, which performs the necessary processing as described above (e.g. correction with LATD) on the output so that the original image that has been read is displayed as a reproduced image (which is a positive image if the original T is a negative film) on the monitor 19.

The operator watches the displayed image and, if necessary, designates the principal area by the principal area designating means such as a mouse. The CPU 204 in the control unit 178 determines various image characteristic quantities from the information on the position of the optionally designated principal area and the LATD, then determines the conditions for exposure [i.e., the amounts of correction of respective colors and densities (quantities of light)] from the determined image characteristic quantities, and applies the above-described color correction control method of the invention to the thusly determined amounts of color correction such that the amounts by which the respective color filter plates 174Y 174C in the filter section should be inserted into the optical path Lt and the amount by which the variable diaphragm 184 should be inserted into the optical path Lt are determined; thereafter the CPU 204 supplies relevant instructions to the drive means 176 and 186.

In accordance with the thus provided settings of the amounts by which the respective color filters should be inserted into the optical path Lt, the drive means 176 and 178 function to insert the respective color filter plates 174Y, 174M and 174C and the variable diaphragm 184 into the optical path Lt, whereupon the moving mirror 156 is retracted from the optical path Lt by moving to the position indicated by a solid line in FIG. 3. Thereafter, the light source 162 turns on and the original T starts to be scanned for copying its image. As already mentioned, the speed of this scanning step is dependent on the speed at which the thermally processable light-sensitive material A is scanned in the exposing section 38 and on the copy ratio.

The light issuing from the light source 162 passes through the IR cut filter 168, the UV cut filter 170 and the B-G notch filter 172 successively and has its color and density (quantity) adjusted by the respective color filter plates 174Y, 174M and 174C and variable diaphragm 184 which have been inserted into the optical path Lt in accordance with the determined conditions for exposure; the thusly adjusted light is admitted through the original T and the transmitted light carrying the image information from the original T passes through the slit 164.

The light passing through the slit 164 is magnified to the copy ratio setting by means of the zoom lens 152 and thereafter reflected by the mirror 154. As already mentioned, for the copying of the original T, the mirror 148 pivots to the position indicated by a dashed line in FIG. 3, so the transmitted light is reflected by the mirror 150 to focus on the thermally processable light-sensitive material A which was withdrawn out of the magazine 20, cut to a predetermined length and transported through the exposing section 38 in synchronism with the above-described operation, thereby performing slit scan exposure on the material A.

The thusly exposed light-sensitive material A is brought into the switchback section 42, then reversed to enter the water application section 46, where it is coated with water which is an image forming solvent; thereafter, the image-receiving material B which was withdrawn out of the magazine 60, cut to a predetermined length and subsequently transported in synchronism with the above-described operation is combined with the light-sensitive material A by means of the laminating roller 80 and the resulting combination is brought into the thermal development and transfer section 58.

The combination of the light-sensitive material a and the image-receiving material B is subjected to thermal development and transfer as it is transported through the gap between the endless belt 96 and the heating drum 82. Thereafter, the light-sensitive material A is first stripped from the heating drum 82 by means of the strip finger 90 and then the image-receiving material B onto which the image has been transferred is stripped from the heating drum 82 by means of the strip finger 92.

The stripped light-sensitive material A is guided by the transport guide plate 114 and other associated members to be brought into the scrap light-sensitive material stack box 116, whereas the image-receiving material B carrying the transferred image is guided by the transport guide plates 118 and other associated members to be ejected onto the tray 126 to produce a hard copy.

The foregoing description of the image forming apparatus of the present invention is mostly directed to the case of forming image from a transmission-type original, particularly, a negative film. It should, however, be understood that this is not the sole case of the invention and it may be applied for copying image from positive transmission-type originals such as reversal films and lantern slides, as well as for forming image from reflection-type originals such as printed matter and photographs.

While the color correction control method of the invention and the apparatus for imagewise exposure implementing that method have been described above in detail, it goes without saying that the invention is in no way limited to the case described above and various modifications and improvements can be made without departing from the spirit and scope of the invention.

As is clear from the foregoing detailed explanation, the color correction control method of the invention is capable of handling negatives that have been shot with an electronic flash or negatives with "color failure" which, when processed by the prior art techniques, have experienced substantial errors in the amounts of color correction due to the upset color balance that requires substantial amounts of correction, thus causing great differences in the amount by which respective color filters are inserted into the optical path. For example, a density difference of 60 cc between colors (1:4 in terms of the ratio between the quantities of light) has caused errors of 4–5 cc. Even in such a case, the method of the invention assures to provide the desired amounts of color correction, with the error being reduced to less than 1 cc, thus providing an outstanding result.

This method is implemented by the apparatus of the invention for imagewise exposure, which also assures the desired amounts of color correction, thereby providing a high-quality image of good color balance at all times.

What is claimed is:

1. A method of controlling color correction, in which three color filters of three primary colors to be inserted into a optical path of light that is issued from a source to be either reflected by a reflection-type original or transmitted through a transmission-type original and which thereafter passes through an imaging lens to reach a light-sensitive recording medium or a imaging device, are controlled in the respective amounts of insertion of said filters such as to correct the color densities of the original image which is carried by the light to be focused on said light-sensitive recording medium or said imaging device, said method comprising the steps of:

preliminarily constructing seven tables for each of said three primary colors that represent the relationships between the amounts of insertion of the filters and the amounts of correction of one of said three primary colors, three of said tables being for the insertion of said three color filters individually into said optical path, three for the insertion of any two filters in combination, and one for the simultaneous insertion of all three filters in combination;

calculating from at least one table for each color the initial values for the amounts of insertion of the three color filters in connection with the required amounts of correction of said three primary colors that is to be effected on the light carrying the original image;

dividing the calculated amounts of insertion of the three filters into three cases for the amount of color correction, one referring to the amount of correction of each color by inserting the combination of the three color filters and which is based on the table for said combination, the second referring to the amount of correction of each color by inserting a combination of said any two color filters and which is based on the table for said combination and the third referring to the amount of correction of each color by inserting a single color filter and which is based on the table for that single color, and performing an arithmetic addition or subtraction on said amounts of color correction to provide a calculated amount of correction of each color;

determining for each color the difference between the thus provided calculated amount of color correction and said required amount of color correction; and using said difference for each color to change the calculated amounts of insertion of said three color filters, repeating the procedures of providing said calculated amount of correction of each color using the calculated amounts of insertion of said three color filters and determining for each color the difference between said calculated amount of color correction and said required amount of color correction, and determining the amounts of insertion of said three color filters at which said difference is less than a specified threshold.

2. A method of controlling color correction according to claim 1, wherein said change in the calculated amounts of insertion of said three color filters using said difference for each color is effected by calculating the amounts of insertion of said three color filters on the basis of said difference for each color using the three tables that have been used to provide said calculated amount of color correction.

3. A method of controlling color correction according to claim 1, wherein said change in the calculated amounts of insertion of said three color filters using said difference for each color is effected by performing an arithmetic addition or subtraction on preset amounts of change in the amounts of insertion of the color filters for each color on the basis of said difference for each color.

4. A method of controlling color correction according to claim 1, which additionally uses light control means in said optical path for adjusting the quantity of light and further includes the steps of:

providing said seven tables for each of said primary three colors in association with more than one quantity of light as adjusted by said light control means; and determining the amounts of insertion of said three color filters necessary to provide the required amount of color correction at a required quantity of light either using as such a group of tables associated with one quantity of light adjustment selected from among the tables associated with said more than one quantity of light adjustment or using an interpolation method as applied to two groups of tables associated with two quantities of light adjustment.

5. An apparatus for imagewise exposure comprising:

a light source for illuminating a reflection- or transmission-type original, an imaging lens to focus the image of said original, a light-sensitive recording medium for recording the focused original image or a imaging device for reading said original image, three filters of three primary colors to be inserted in the optical path from said light source to said light-sensitive recording medium or said imaging device, and color correction control means which controls the respective amounts of insertion of said three color filters such as to correct the color densities of the original image which is carried by the light to be focused on said light-sensitive recording medium or said imaging device, said color correction control means having seven tables that have been constructed preliminarily for each of said three primary colors and which represent the relationships between the amounts of insertion of the filters and the amounts of correction of one of said three primary colors, three of said tables being for the insertion of said three color filters individually into said optical path, three for the insertion of any two filters in combination, and one for the simultaneous insertion of all three filters in combination, said color correction control means also having computing means which:

calculates from at least one table for each color the initial values for the amounts of insertion of the three color filters in connection with the required amounts of correction of said three primary colors that is to be effected on the light carrying the original image;

divides the calculated amounts of insertion of the three filters into three cases for the amount of color correction, one referring to the amount of correction of each color by inserting the combination of the three color filters and which is based on the table for said combination, the second referring to the amount of correction of each color by inserting a combination of said any two color filters and which is based on the table for said combination and the third referring to the amount of correction of each color by inserting a single color filter and which is based on the table for that single color, and performs an arithmetic addition or subtraction on said amounts of color correction to provide a calculated amount of correction of each color;

determines for each color the difference between the thus provided calculated amount of color correction and said required amount of color correction; and uses said difference for each color to change the calculated amounts of insertion of said three color filters, repeats the procedures of providing said calculated amount of correction of each color using the calculated amounts of insertion of said three color filters and determine for each color the difference between said calculated amount of color correction and said required amount of color correction, and determines the amounts of insertion of said three color filters at which said difference is less than a specified threshold.

6. An apparatus for imagewise exposure according to claim 5, wherein said computing means, when changing the calculated amounts of insertion of said three color filters using said difference for each color, calculates the amounts of insertion of said three color filters on the basis of said difference for each color using the three tables that have been used to provide said calculated amount of color correction.

7. An apparatus for imagewise exposure according to claim 5, wherein said computing means changes the calculated amounts of insertion of said three color filters using said difference for each color by performing an arithmetic addition or subtraction on preset amounts of change in the amounts of insertion of the color filters for each color on the basis of said difference for each color.

8. An apparatus for imagewise exposure according to claim 5, which further includes light control means for adjusting the quantity of light, said color correction control means further having a group of said seven tables for each of said three primary colors in association with more than one quantity of light as adjusted by said light control means, and said computing means determining the amounts of insertion of said three color filters necessary to provide the required amount of color correction at a required quantity of light either using as such a group of tables associated with one quantity of light adjustment selected from among the tables associated with said more than one quantity of light adjustment or using an interpolation method as applied to two groups of tables associated with two quantities of light adjustment.

* * * * *